US012525336B2

United States Patent
Foster et al.

(10) Patent No.: US 12,525,336 B2
(45) Date of Patent: Jan. 13, 2026

(54) INTELLIGENT MEDICAL ASSESSMENT AND COMMUNICATION SYSTEM WITH ARTIFICIAL INTELLIGENCE

(71) Applicant: Mindset Medical, Inc., Phoenix, AZ (US)

(72) Inventors: Mitchell Andrew Foster, Scottsdale, AZ (US); Nicholas Theodore, Ruxton, MD (US); Neil Robert Crawford, Chandler, AZ (US); Mark Louis Whitehouse, Scottsdale, AZ (US); Christopher Don Joslin, Phoenix, AZ (US)

(73) Assignee: Mindset Medical, Inc., Phoenix, AZ (US)

( * ) Notice: Subject to any disclaimer, the term of this patent is extended or adjusted under 35 U.S.C. 154(b) by 233 days.

(21) Appl. No.: 17/866,286

(22) Filed: Jul. 15, 2022

(65) Prior Publication Data

US 2023/0020654 A1 Jan. 19, 2023

Related U.S. Application Data

(60) Provisional application No. 63/222,419, filed on Jul. 16, 2021, provisional application No. 63/222,421, filed on Jul. 16, 2021.

(51) Int. Cl.
*G16H 30/40* (2018.01)
*G06T 3/40* (2024.01)
(Continued)

(52) U.S. Cl.
CPC ........... *G16H 30/40* (2018.01); *G06T 3/40* (2013.01); *G06T 3/60* (2013.01); *G06T 7/0014* (2013.01);
(Continued)

(58) Field of Classification Search
CPC .................. G06Q 50/20–26; G16H 30/40
See application file for complete search history.

(56) References Cited

U.S. PATENT DOCUMENTS

| | | | | |
|---|---|---|---|---|
| 11,195,281 | B1 * | 12/2021 | Schoess | A61B 5/445 |
| 11,727,560 | B2 * | 8/2023 | DaCosta | G06T 7/12 |
| 11,779,222 | B2 * | 10/2023 | Su | G16H 50/20 |
| | | | | 600/306 |

(Continued)

FOREIGN PATENT DOCUMENTS

CN 109857175 A 6/2019

OTHER PUBLICATIONS

Masson-Meyers DS, Andrade Tam, Caetano GF, et al. Experimental models and methods for cutaneous wound healing assessment. Int J Exp Path. 2020; 101:21-37. https://doi.org/10.1111/ (Year: 2020).*

(Continued)

*Primary Examiner* — Christopher L Gilligan
*Assistant Examiner* — Jessica Marie Webb
(74) *Attorney, Agent, or Firm* — Greenberg Traurig, LLP

(57) ABSTRACT

In some embodiments, the system is directed to medical assessment software for analyzing one or more medical conditions and enabling communication between a medical professional and a patient. In some embodiments, the system includes one or more graphical user interfaces configured to enable a medical professional to execute one or more of scheduling a virtual appointment, view a virtual schedule, check patients in/out, enter new patients into the system, request patient recorded outcomes, and view patient progress. In some embodiments, the system is configured to implement an artificial intelligence (AI) algorithm configured to identify one or more unique features within the one or more images and use the one or more unique features as one or more fiducials during an analysis of the one or more images. In some embodiments, the analysis includes a (Continued)

determination of whether an abnormal condition associated with an area of skin is progressing toward healing.

11 Claims, 40 Drawing Sheets

(51) Int. Cl.
    *G06T 3/60*     (2024.01)
    *G06T 7/00*     (2017.01)
    *G06T 7/90*     (2017.01)
    *G16H 50/30*     (2018.01)

(52) U.S. Cl.
    CPC ............... *G06T 7/90* (2017.01); *G16H 50/30* (2018.01); *G06T 2200/24* (2013.01); *G06T 2207/10024* (2013.01); *G06T 2207/10048* (2013.01); *G06T 2207/20081* (2013.01); *G06T 2207/30088* (2013.01)

(56) References Cited

U.S. PATENT DOCUMENTS

| | | | |
|---|---|---|---|
| 2013/0096392 A1* | 4/2013 | Adams | A61B 5/0075 600/301 |
| 2014/0313303 A1* | 10/2014 | Davis | A61B 5/68 348/77 |
| 2015/0254851 A1 | 9/2015 | Daly et al. | |
| 2018/0296283 A1* | 10/2018 | Crawford | G06T 3/02 |
| 2019/0015037 A1 | 1/2019 | Shen et al. | |
| 2019/0385308 A1 | 12/2019 | Kandlikar et al. | |
| 2020/0211193 A1* | 7/2020 | Adiri | A61B 5/0013 |
| 2020/0261016 A1* | 8/2020 | Baker | G16H 30/40 |
| 2021/0142890 A1* | 5/2021 | Adiri | G16H 15/00 |
| 2021/0343017 A1* | 11/2021 | Jordan | G16H 50/30 |
| 2021/0344880 A1* | 11/2021 | Katra | G06T 7/0012 |
| 2022/0157459 A1* | 5/2022 | Siewerdsen | G06N 5/01 |
| 2022/0383496 A1* | 12/2022 | D'Amelio | G06T 7/0016 |

OTHER PUBLICATIONS

Korotkov et al., Computerized analysis of pigmented skin lesions: a review. Artificial intelligence in medicine, 2012, vol. 56, No. 2, pp. 69-90.

International Search Report and Written Opinion in related International Application No. PCT/US2022/037372, dated Nov. 3, 2022, 10 pages.

\* cited by examiner

Add a new patient

First Name: ☐

Last Name: ☐

Date of Birth: MM/DD/YYYY

Email Address: ☐

Cell Phone: ☐

[INVITE PATIENT] — 2001

CLICK HERE TO BULK UPLOAD PATIENTS — 2002

Bulk Upload Patients

Send PROs to Ne

*Send PROs* ▽

SEND PRO REQUEST(S)

OR

*Select Campaign*

Abbott

Appointment Follow Up

JH Cervical

Mixed Campaign

Mixed Test

PRO Test Mixed

Test

Test Campaign video

1. Mia Doe: Status: Account created
2. Tristan Doe: Status: Account created
3. Mia Doe: Status: Account created
4. Kai Doe: Status: Account created

8001

Start Date
03/14/2020

< March 2020 >
Sun Mon Tue Wed Thu Fri Sat
　　　　　　　1　　2　　3　　4　　5　　6　　7
　8　　9　10　11　12　13　(14)
15　16　17　18　19　20　21
22　23　24　25　26　27　28
29　30　31

| Patient Overview | Releases | PRO | Headache Overview | Pain Overview |
|---|---|---|---|---|

| REVIEW FORM(S) | | |
|---|---|---|
| Form | %Complete | Summary |
| About Me | 100% | DOB 06/10/1970 |
| Insurance | 100% | Insurer: Anthem, Policy: WID123456789 |
| Symptoms | 100% | Muscle pain, Back pain, Unsteady steps, Lower back pain with pain radi... |
| Medication | 67% | Advil |
| Medical History | 100% | None reported |

FIG. 11

PRO SUBMISSIONS   PRO CAMPAIGNS   SURGERIES

NDI, MIDAS, ODI ▽    SEND PRO REQUEST(S)

Select PROs
☐ DIGESTIVE-HEALTH
☐ EQ₅D
☐ HEADACHE
☐ HIT-6
☑ MIDAS
☑ NDI
☑ ODI
☐ PAIN
☐ PHQ₉
☐ PROMIS-29
☐ START-BACK
☐ ANSPE-6

Select PROS ▽    SEND PRO REQUEST(S)

| Type | Score | Last Action |
|------|-------|-------------|
| MIDAS | | Requested-12/04/2019 |
| ODI | | Requested-12/04/2019 |
| NDI | | Requested-12/04/2019 |
| ODI | ODI-28, Back Pain 3. R Leg 0. L Leg 3 | Requested-12/04/2019 |
| ODI | ODI-o. Back Pain 2. R Leg 2. L Leg o | Requested-12/04/2019 |

Rows per page: 5 ▽   1-5 of 6   <   >

FIG. 13

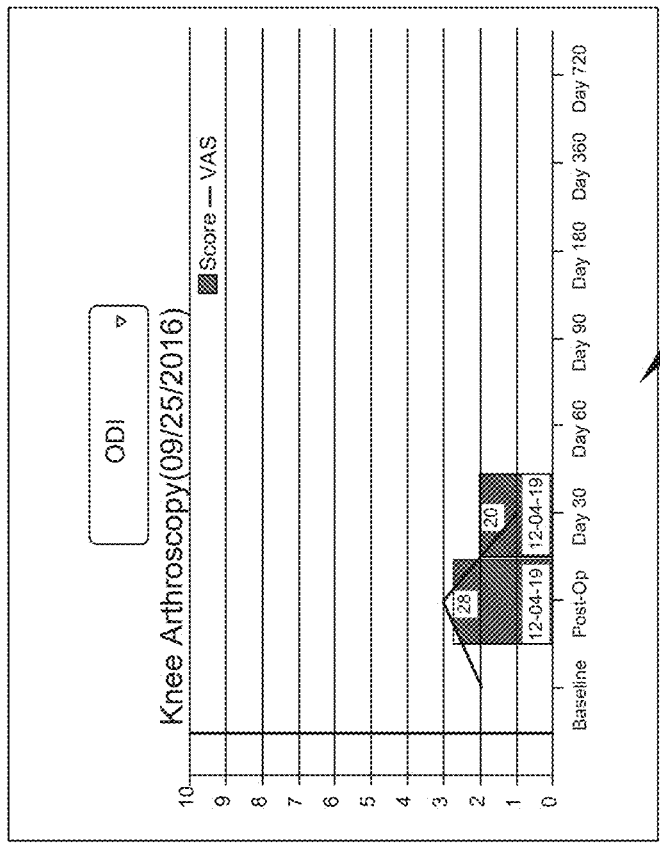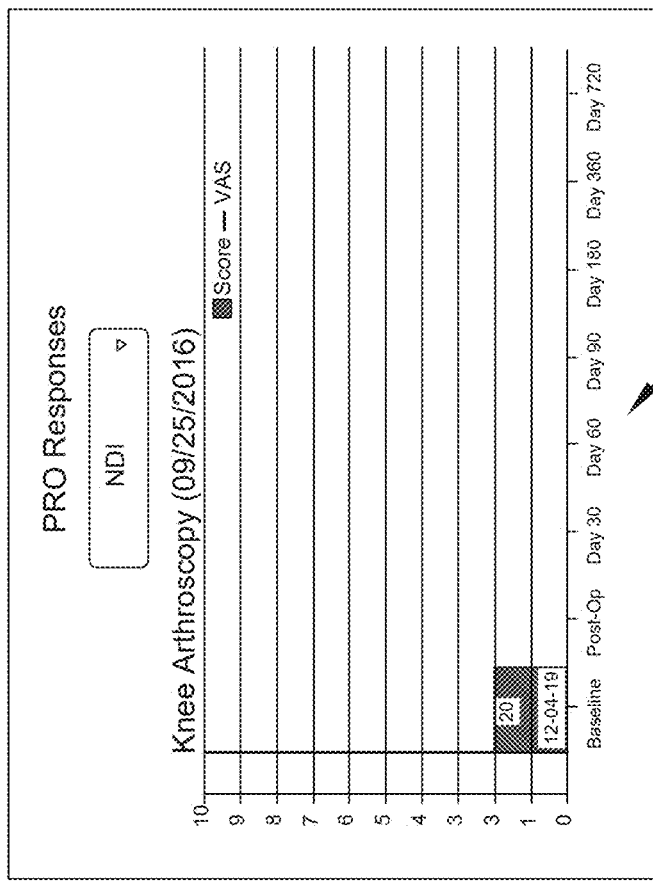
FIG. 14

FIG. 16

| Type | Status | Series Start | |
|---|---|---|---|
| HIT-6 | 12/19/2019: PRO Scheduled<br>01/18/2020: PRO Scheduled<br>02/17/2020: PRO Scheduled<br>03/18/2020: PRO Scheduled<br>06/16/2020: PRO Scheduled<br>12/13/2020: PRO Scheduled<br>12/08/2021: PRO Scheduled | 12/19/2019 | CANCEL CAMPAIGN |

Rows per page: 5 ▽  1-1 of 1 < >

CREATE A CARE PATHWAY BUNDLE

21001

Care Pathway Bundled Events

| Name ↑ |
| --- |
| Anterior Lumbar Fusion |
| Lumbar Assessment |
| New Patient Intake |

Rows per page: 15 ▽   1-3 of 3 < >

The Impact of Safety Stop Logic

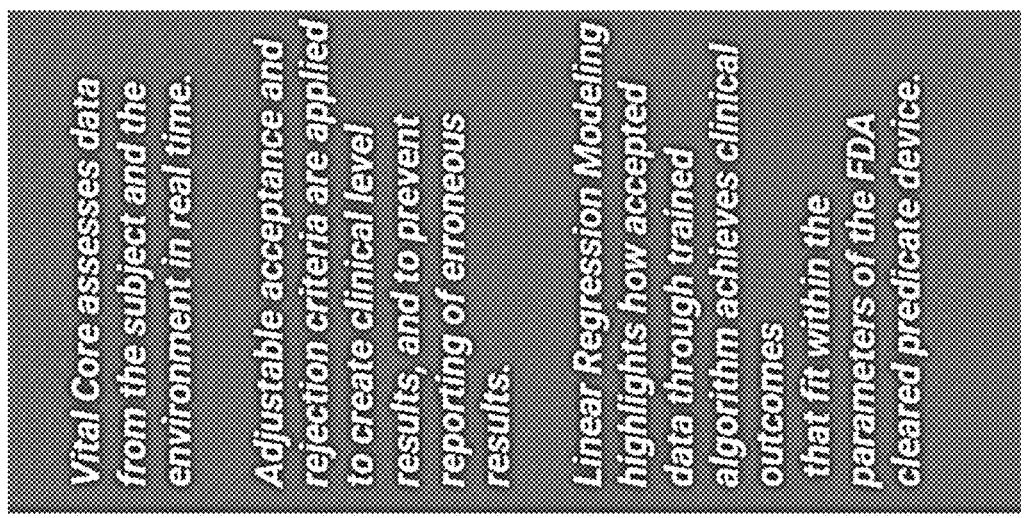

*Vital Core assesses data from the subject and the environment in real time.*

*Adjustable acceptance and rejection criteria are applied to create clinical level results, and to prevent reporting of erroneous results.*

*Linear Regression Modeling highlights how accepted data through trained algorithm achieves clinical outcomes that fit within the parameters of the FDA cleared predicate device.*

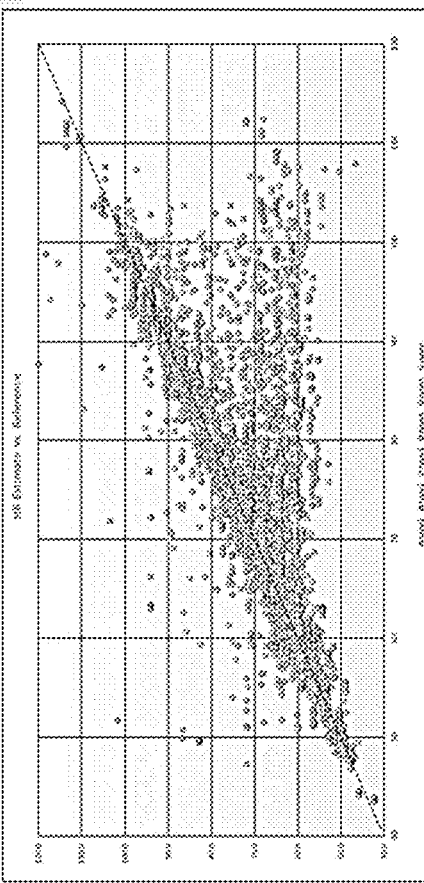

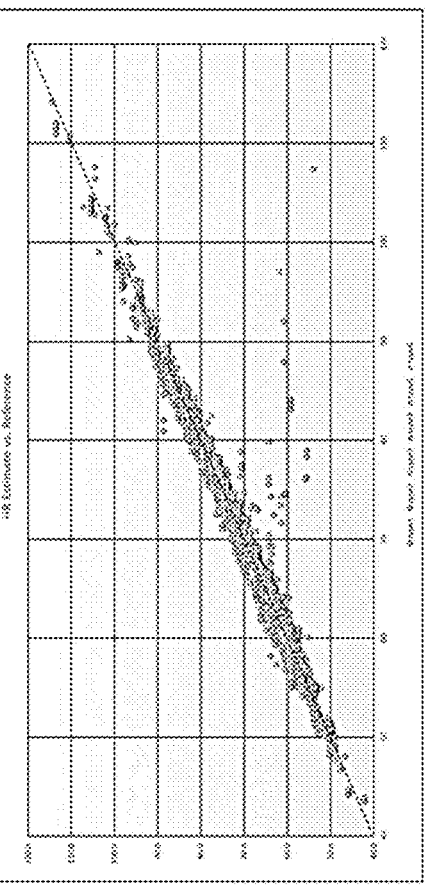

All data without rejection criteria produces:

RMSE of 7.27

76% of data points within +/- 3

All data with rejection criteria applied produces:

RMSE of 1.3

96% of data points within +/- 3

FIG. 39

INTELLIGENT MEDICAL ASSESSMENT AND COMMUNICATION SYSTEM WITH ARTIFICIAL INTELLIGENCE

RELATED APPLICATIONS

This application claims priority to and the benefit of U.S. Provisional Application No. 63/222,419, filed Jul. 16, 2021 and U.S. Provisional Application No. 63/222,421, filed Jul. 16, 2021, the entire contents of which are incorporated herein by reference.

BACKGROUND

Currently wound care treatment, both chronic and acute, requires that a physician see a patient during multiple physical visits. During the pandemic of 2020, it became difficult or impossible for these visits to occur in a traditional face-to-face setting. Although video conferencing offered some communication capabilities, it was often impossible to accurately assess medical conditions from a remote location. This same problem persists today.

Therefore, there is a need for an intelligent medical assessment and communication system with artificial intelligence capable of supplementing medical diagnosis when in-person visits are not possible or convenient.

SUMMARY

In some embodiments, the system is directed to medical assessment software for analyzing one or more medical conditions that enables communication between a medical professional and a patient. In some embodiments, the system includes one or more computers comprising one or more processors and one or more non-transitory computer readable media, the one or more non-transitory computer readable media comprising instructions stored thereon that when executed cause the one or more computers to implement one or more graphical user interfaces (GUIs) In some embodiments, the GUIs are configured to enable a medical professional (e.g., doctor, nurse, healthcare provider, etc.) to execute one or more of scheduling a virtual appointment, view a virtual schedule, check patients in/out, enter new patients into the system, request patient recorded outcomes, and view patient progress.

In some embodiments, the one or more non-transitory computer readable media comprise instructions stored thereon that when executed cause the one or more computers to implement an artificial intelligence (AI) algorithm. In some embodiments, one or more GUIs described herein are configured to enable an upload of one or more images to the one or more non-transitory computer readable media. In some embodiments, the AI algorithm is configured to identify one or more unique features within the one or more images. In some embodiments, the AI algorithm is configured to use the one or more unique features as one or more fiducials during an analysis of the one or more images. In some embodiments, the analysis includes a determination of whether an abnormal condition associated with an area of skin is progressing toward healing.

In some embodiments, the system further comprising medical assessment software configured to display the one or more GUIs. In some embodiments, the medical assessment software is configured to enable communication between a health care provider and a patient. In some embodiments, the medical assessment software comprises the one or more GUIs. In some embodiments, the determination includes whether the abnormal condition associated with the area of skin at risk for infection, infected, and non-healing. In some embodiments, the one or more unique features include a body feature. In some embodiments, a body feature includes one or more of hair, freckles, scars, tattoos, moles, bumps, depressions, veins, joints, muscle shape, teeth, eyes, nose, ears, skin folds, fingernails, and/or any other permanent feature on a patient's body.

In some embodiments, the abnormal condition includes a wound. In some embodiments, the determination includes one or more of wound length, wound width, wound area, wound margin width, within wound coloration, surrounding wound coloration, within wound dryness, within wound flakiness, surrounding wound dryness, and surrounding wound flakiness. In some embodiments, the AI algorithm is configured to determine a stage of wound healing.

In some embodiments, the one or more images comprise a first image and a second image. In some embodiments, the AI algorithm is configured to determine red, green, blue (RGB) color values for different regions of the first image and the second image. In some embodiments, the determination includes comparing the first image to the second image to determine a change in RGB values for the different regions from the first image to the second image. In some embodiments, the one or more images comprise a first infrared image and a second infrared image. In some embodiments, the AI is configured to determine temperature values for different regions of the first infrared image and the second infrared image. In some embodiments, the determination includes comparing the first infrared image to the second image to determine a change in temperature values for the different regions from the first image to the second image.

In some embodiments, the instructions cause the one or more computers to receive, by the one or more processors, a first base image from via the GUI. In some embodiments, the instructions cause the one or more computers to receive, by the one or more processors, one or more different images via the GUI. In some embodiments, the instructions cause the one or more computers to identify, by the AI algorithm, one or more fiducials within the first base image. In some embodiments, the instructions cause the one or more computers to execute, by the AI algorithm, a comparison of the one or more fiducials in the first base image to one or more unique features within the one or more different images. In some embodiments, the instructions cause the one or more computers to determine, based on the comparison, if the one or more unique features within the one or more different images are a match to the one or more fiducials within the first base image. In some embodiments, the instructions cause the one or more computers to generate, by the AI algorithm, one or more normalized images of the one or more uploaded images using the comparison.

In some embodiments, the instructions cause the one or more computers to execute, by the AI algorithm, a transformation of the one or more different images to a matching scale of the first base image using a size of the one or more unique features in first base image to obtain the normalized images. In some embodiments, the instructions cause the one or more computers to execute, by the AI algorithm, a transformation of the one or more different images to a matching color of the first base image using a color of the one or more unique features the first base image to obtain the normalized images. In some embodiments, the instructions cause the one or more computers to execute, by the AI algorithm, a transformation of the one or more different images to a matching orientation of the first base image using a location of the one or more unique features in the first base image.

In some embodiments, the instructions cause the one or more computers to determine, by the AI algorithm, if the one or more abnormal conditions comprise a surgical wound. In some embodiments, the instructions cause the one or more computers to determine, by the AI algorithm, a change in shape of the abnormal condition. In some embodiments, the instructions cause the one or more computers to determine, by the AI algorithm, if the abnormal condition comprises edema.

In some embodiments, the AI algorithm is configured to determine if one or more images comprise one or more normal skin images. In some embodiments, the AI algorithm is configured to determine if one or more images comprise one or more abnormal skin images. In some embodiments, the AI algorithm is configured to identify abnormal areas of each of the one or more abnormal skin images. In some embodiments, the AI algorithm is configured to identify uninjured areas of each of the one or more abnormal skin images.

In some embodiments, the disclosure is directed to a method of training artificial intelligence to analyze one or more medical conditions. In some embodiments, a method step includes sending to the AI a first training image set comprising a first base image of a skin area and different images of the skin area. In some embodiments, a method step includes training the AI to identify one or more permanent features on the skin area of the first base image. In some embodiments, a method step includes training the AI to assign each of the one or more permanent features as one or more fiducials, respectively. In some embodiments, a method step includes training the AI to execute a normalization of the one or more different images using the one or more fiducials.

In some embodiments, training the AI to execute the normalization comprises training the AI to execute a transformation of the one or more different images to a matching scale of the first base image using a size of the one or more permanent features on the skin area of the first base image. In some embodiments, training the AI to execute the normalization comprises training the AI to execute a transformation of the one or more different images to a matching color of the first base image using a color of the one or more permanent features on the skin area of the first base image. In some embodiments, training the AI to execute the normalization comprises training the AI to execute a transformation of the one or more different images to a matching orientation of the first base image using a location of one or more permanent features on the skin area of the first base image.

In some embodiments, a method step includes training the AI to determine if the one or more training images comprise one or more normal skin images. In some embodiments, a method step includes training the AI to determine if the one or more training images comprise one or more abnormal skin images. In some embodiments, a method step includes training the AI to identify abnormal areas of each of the one or more abnormal skin images. In some embodiments, a method step includes training the AI to identify normal areas of each of the one or more injured skin images.

In some embodiments, a method step includes training the AI to determine if the one or more training images comprise one or more abnormal skin images. In some embodiments, a method step includes training the AI to determine if abnormal skin from the one or more injured skin images are one or more of progressing toward healing, at risk for infection, infected, and non-healing. In some embodiments, a method step includes training the AI to determine if the one or more abnormal skin images comprises a surgical wound. In some embodiments, a method step includes training the AI to identify one or more of hair, freckles, scars, tattoos, moles in the one or more training images. In some embodiments, a method step includes training the AI to determine one or more of wound length, wound width, wound area, wound margin width, within wound coloration, surrounding wound coloration, within wound dryness, within wound flakiness, surrounding wound dryness, and surrounding wound flakiness.

In some embodiments, a method step includes providing one or more calibration fiducials within the first base image. In some embodiments, a method step includes training the AI to determine attributes of the one or more permanent features using the one or more calibration fiducials. In some embodiments, a method step includes training the AI to determine environmental attributes of the first base image using the one or more calibration fiducials. In some embodiments, the environmental attributes include one or more of ambient light intensity and ambient light color.

In some embodiments, a method step includes training the AI to determine a stage of wound healing. In some embodiments, a method step includes training the AI to determine a stage of edema. In some embodiments, a method step includes training the AI to determine red, green, blue (RGB) color values for different regions of an image. In some embodiments, a method step includes training the AI to determine RGB color values changes in different images of a same area of skin. In some embodiments, a method step includes training the AI to determine skin temperature using infrared images. In some embodiments, a method step includes training the AI to determine temperature changes in different images of a same area of skin.

DRAWING DESCRIPTION

FIG. 2 shows an add new patient window 2000 according to some embodiments.

FIG. 8 shows a campaign workflow according to some embodiments.

FIG. 10 shows a non-limiting example patient record dashboard GUI 10000 according to some embodiments.

FIG. 11 illustrates a patient overview tab layout 1100 according to some embodiments.

FIG. 13 shows the PRO selection list process according to some embodiments.

FIG. 14 illustrates an NDI graph 14001, and ODI graph 14002 according to some embodiments.

FIG. 16 shows a pathway list 16001 generated by the system upon selection of the select care pathway menu 15001, as well as a start data 15003 selection calendar 16002 according to some embodiments.

FIG. 17 shows an updated care pathway table 17000 according to some embodiments.

FIG. 21 shows an updated care pathway bundled events GUI 21001.

FIG. 31 shows a virtual schedule GUI 31000 according to some embodiments.

FIG. 39 shows the impact of the workflow of FIG. 38 according to some embodiments.

DETAILED DESCRIPTION

In some embodiments, the system includes one or more computers comprising one or more processors and one or more non-transitory computer readable media. In some embodiments, the one or more non-transitory computer readable media comprises instructions that cause the one or more computers to implement one or more steps. In some embodiments, a computer implemented step includes generating, by the one or more processors, a graphical user interface ("GUI").

In some embodiments, a computer implemented step includes generating, by the one or more processors, a GUI configured to enable a user to enter authentication credentials. In some embodiments, a computer implemented step includes generating, by the one or more processors, a GUI configured to enable a user to select a clinic. In some embodiments, a computer implemented step includes generating, by the one or more processors, a GUI comprising a patient table.

Figure 1:
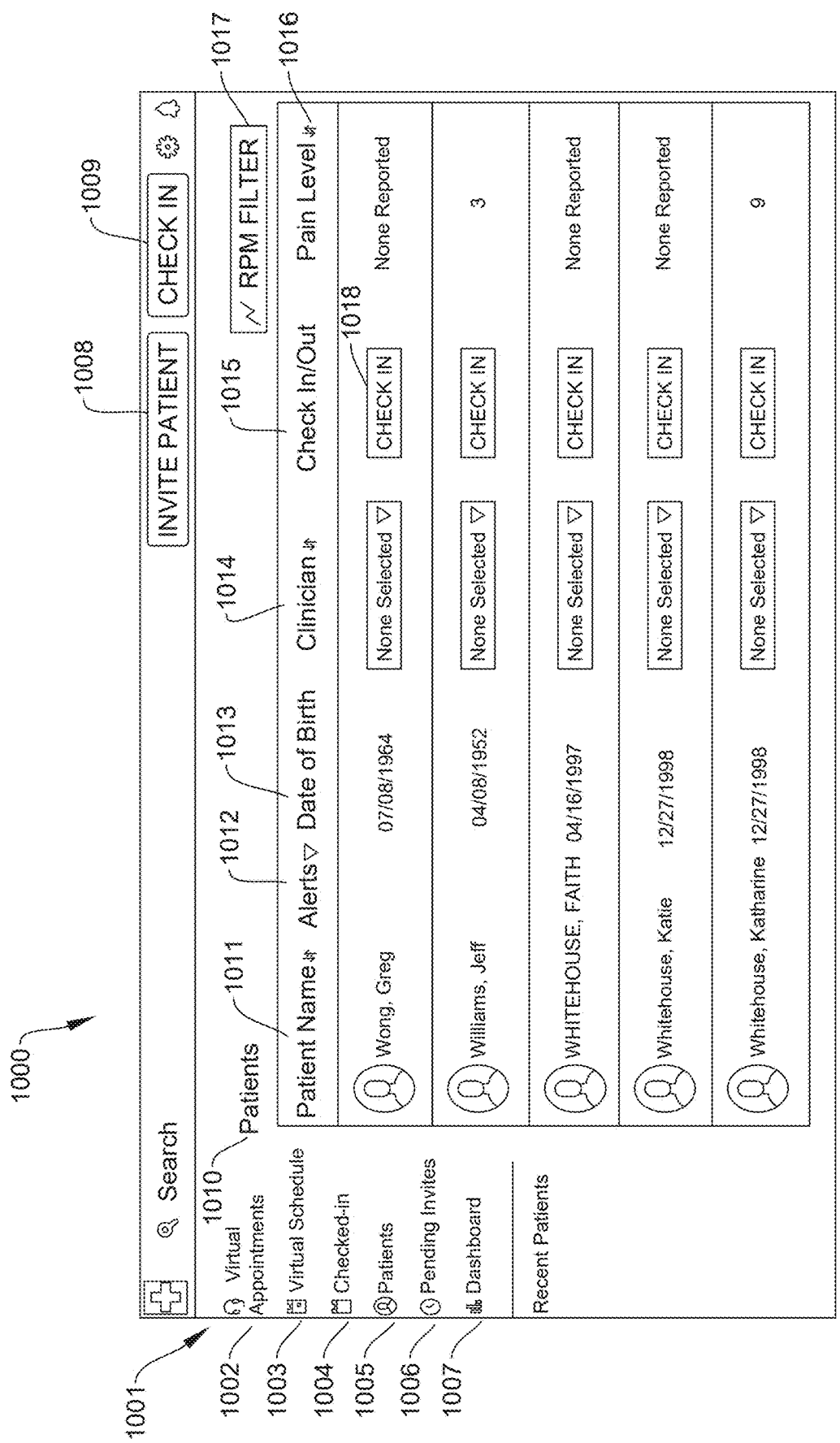
FIG. 1 illustrates a patient table GUI 1000 according to some embodiments.

FIG. 1 illustrates a patient table GUI 1000 according to some embodiments. In some embodiments, the patient table GUI includes a menu 1001. In some embodiments, the menu includes one or more links. In some embodiments, the one or more links include one or more of a virtual appointments link 1002, a virtual schedule link 1003, a checked-in link 1004, a patients link 1005, a pending invites link 1006, and a dashboard link 1007.

In some embodiments, selecting a virtual appointments link 1002 causes the one or more processors to generate a GUI that displays all the virtual exam rooms available to the clinic. In some embodiments, selecting a virtual schedule link 1003 causes the one or more processors to generate a GUI that displays all scheduled virtual exams by time (e.g., day and/or week). In some embodiments, selecting a checked-in link 1004 causes the one or more processors to generate a GUI that displays any patients that have physically checked into a health provider's clinic.

In some embodiments, selecting a patient's link 1005 causes the one or more processors to generate a GUI that displays one or more patient records. In some embodiments, selecting a pending invites link 1006 causes the one or more processors to generate a GUI that displays patients that have been invited into the provider portal but have existing accounts with another clinic and/or have an existing system patient account and have yet to share their patient information. In some embodiments, selecting a dashboard link 1007 causes the one or more processors to generate a clinic dashboard GUI that displays one or more of an overview of provider metrics; one or more clinic-level key performance indicators (KPIs) for patient participation rate; patient reported outcomes (PRO) completion rates; audio/video compliance; one or more pain reports; and statistics for the last calendar month. In some embodiments, the details of each KPI are displayed on the clinic dashboard GUI.

In some embodiments, the patient table GUI 1000 includes an invite patient link 1008 and a check-in link 1009. In some embodiments, a computer implement step includes generating, by the one or more processors, a graphical user interface that includes a patient summary GUI 1010. In some embodiments, the patient summary GUI 1010 includes one or more columns that include one or more of a patient name column 1011, an alerts column 1012, a date of birth (DOB) column 1013, a clinician column 1014, a check in/out column 1015, and a pain level column 1016. In some embodiments, the arrangement of the patient table GUI 1000 saves a health care provider time by enabling a review of the pain level of multiple patients at the same time. In some embodiments, the patient table GUI 1000 includes an RPM filter 1017. In some embodiments, the patient table GUI 1000 is configured to enable a user to check a patient in by selecting a check in icon 1018. In some embodiments, the selection of the RPM filter icon 1017 enables selection to display one or more pain type filters which cause the GUI to filter out all patients that do not have the chosen selection.

In some embodiments, the system is configured to generate an add new patient window 2000 when the invite patient link 1008 is selected. FIG. 2 shows an add new patient window 2000 according to some embodiments. In some embodiments, the add new patient window 2000 is configured to enable a user to enter patient identifying information that includes, in this non-limiting example, first name, last name, DOB, email address, and/or cell phone number. In some embodiments, the add new patient window 2000 includes an invite patient icon 2001 to initiate the invitation, and also includes a bulk patient upload link 2002 configured to enable a user to upload multiple patients to the system simultaneously, which is further described below.

Figure 3:
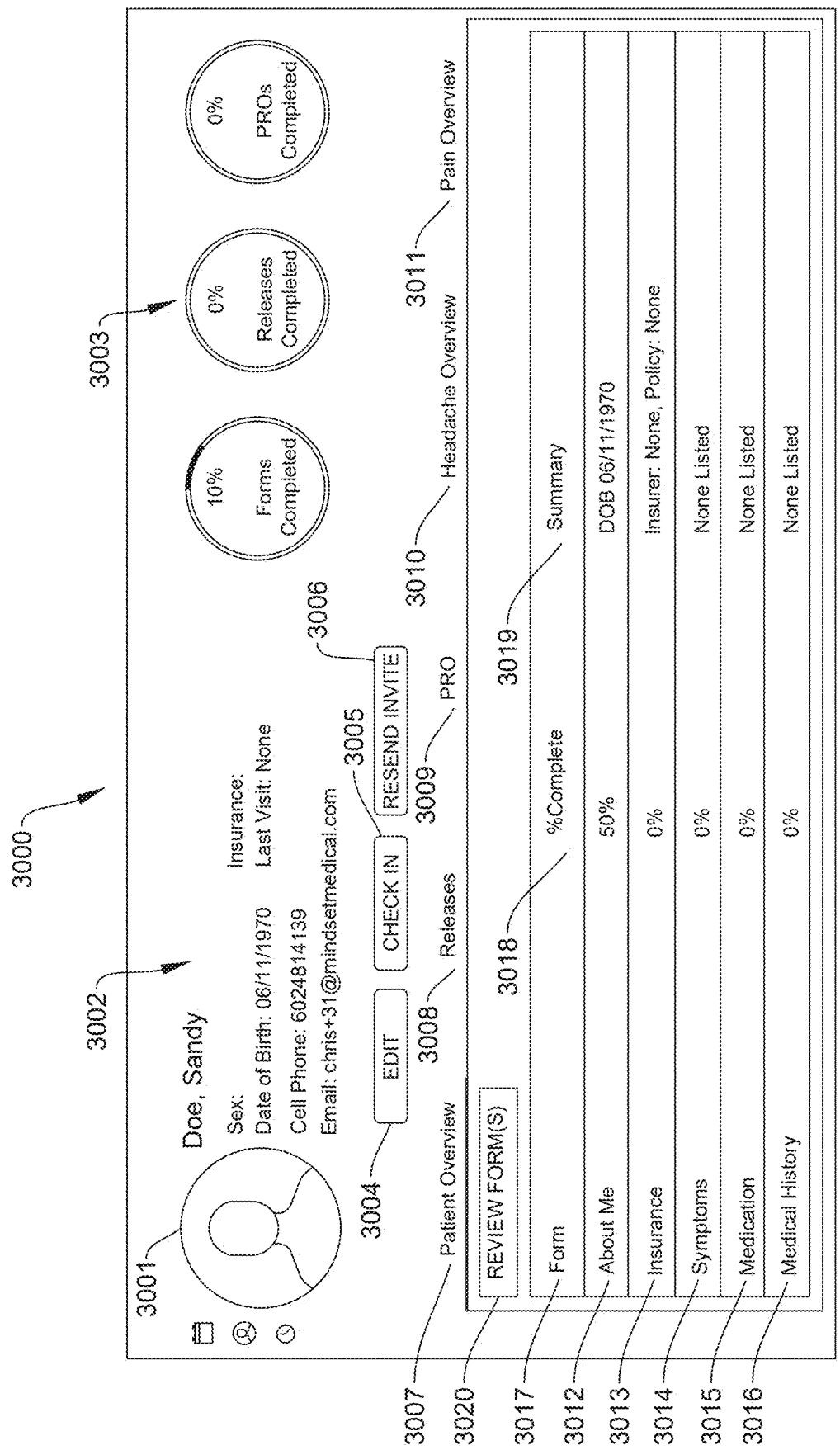
FIG. 3 shows a patient invite dashboard GUI 3000 according to some embodiments.

In some embodiments, the system is configured to generate a patient invite dashboard GUI 3000 after the invite patient icon 2001 is selected. FIG. 3 shows a patient invite dashboard GUI 3000 according to some embodiments. In some embodiments, a patient invite dashboard GUI 3000 includes one or more of a patient picture 3001, patient identifying information 3002, a patient data entry overview 3003, an edit icon 3004, a check in icon 3005, a resend invite icon 3006, an overview tab 3007, a releases tab 3008, a PRO tab 3009, a headache overview tab 3010, and a pain overview tab 3011. In some embodiments, the patient data entry overview 3003 is configured to display a completion rate for one or more patient requested documents and/or reports which include such non-limiting examples as one or more of forms completed, releases completed, images for AI analysis, and PROs completed. In some embodiments, the patient overview tab 3007 is configured to display one or more patient completed and/or requested forms 3017 that include, as non-limiting examples: About Me 3012, Insurance 3013, Symptoms 3014, Medication 3015, and Medical History 3016. In some embodiments, the patient overview tab 3007 is configured to display a completion rate for one or more forms 3017. In some embodiments, the patient overview tab 3007 is configured to display a summary 3019 associated with each form, thereby enabling a comprehensive overview of the status of required patient records. In some embodiments, the patient overview tab 3007 is configured to display a review forms icon 3020 which generates one or more GUIs displaying one or more forms described herein. In some embodiments, the system is configured to generate an error message is there is already an email associated with a patient account.

Figure 4:
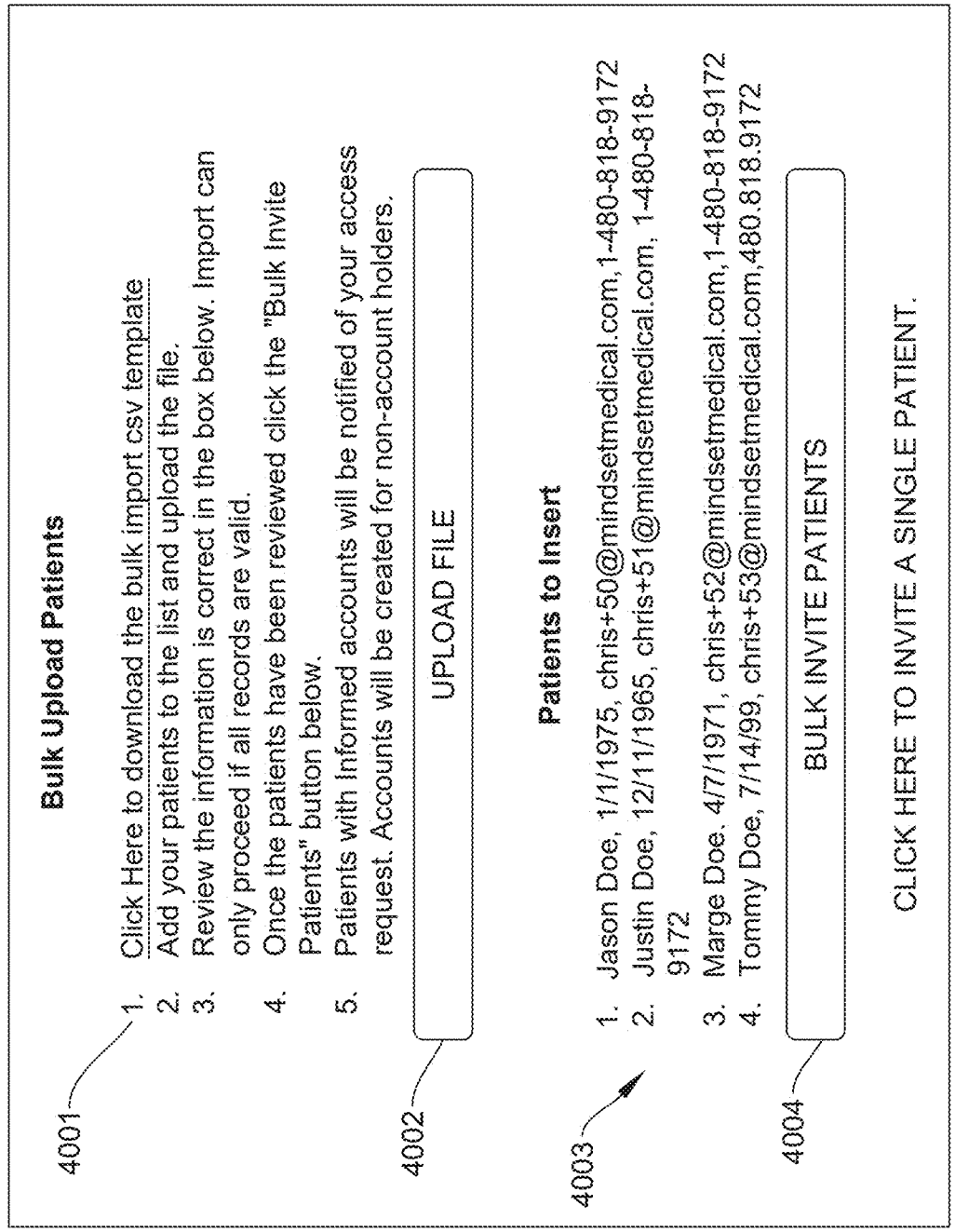
FIG. 4 shows a bulk upload instructions window 4000 according to some embodiments.
Figure 5:
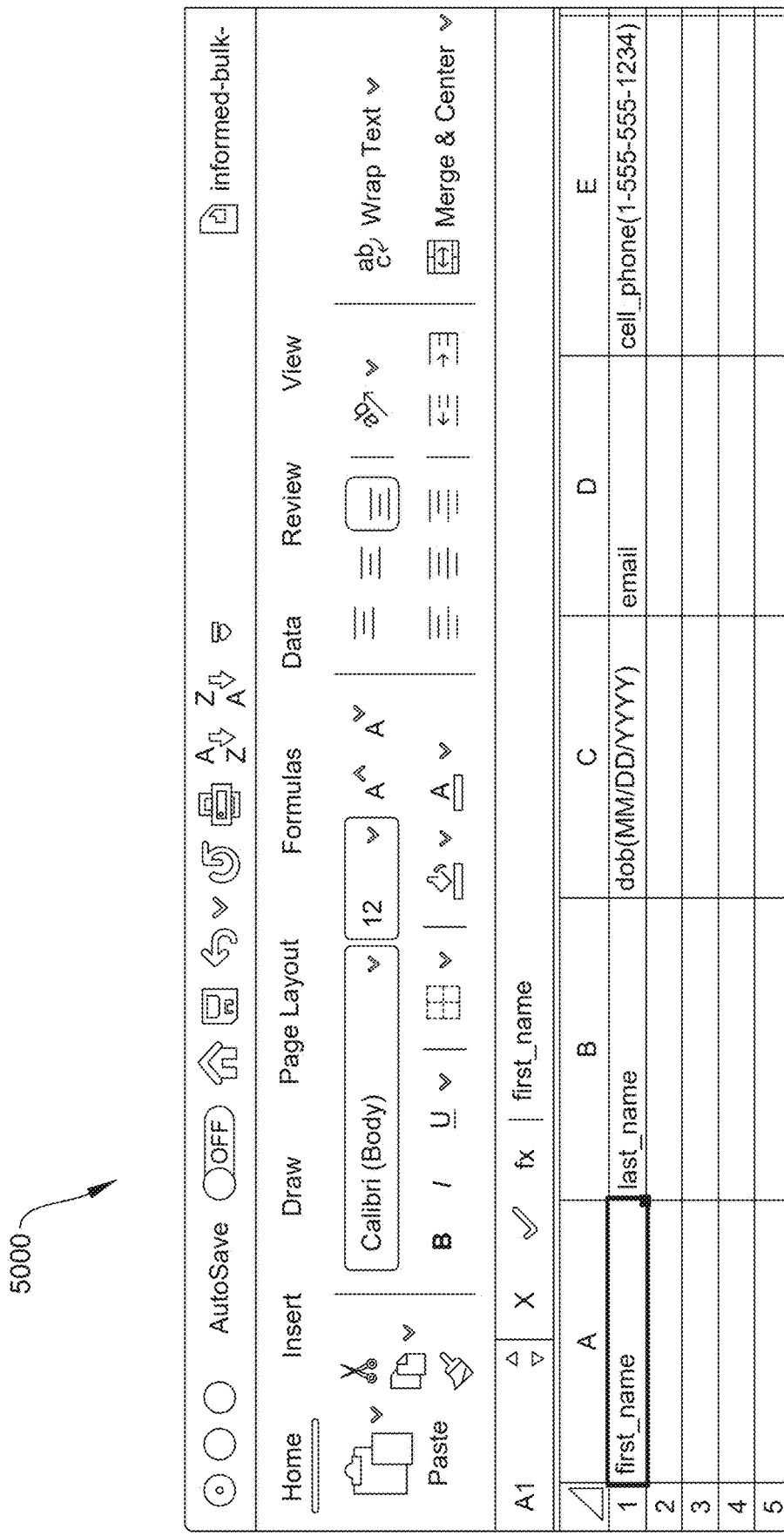
FIG. 5 shows a bulk upload template 5000 according to some embodiments.

In some embodiments, the system is configured to execute a bulk upload program upon selection of the bulk patient upload link 2002. In some embodiments, the system is configured to generate, by the one or more processors, a bulk upload instructions window 4000 upon selection of the bulk patient upload link 2002. FIG. 4 shows a bulk upload instructions window 4000 according to some embodiments. In some embodiments, the bulk upload instruction window includes a template (e.g., CSV) download link 4001. In some embodiments, selection of the template download link 4001 cause the one or more processors to send a bulk upload template 5000 to the user's computer. FIG. 5 shows a bulk upload template 5000 according to some embodiments. In some embodiments, the bulk upload template 5000 includes one or more columns and/or rows configured to enable a user to enter patient identifying information for multiple patients that includes, in this non-limiting example, first name, last name, DOB, email address, and/or cell phone number. In some embodiments, the bulk upload instructions window 4000 includes an upload file icon 4002 configured to cause the one or more processors to generate a file explorer window and receive the completed bulk upload template 5000 once selected. In some embodiments, once the system receives the completed bulk upload template the system is configured to generate a bulk upload summary 4003 which enables verification that the upload was successful. In some embodiments, the system is configured to highlight (e.g., font color, shape, etc.) patient information that is incorrect (e.g., wrong format, wrong characters, etc.).

Figure 6:
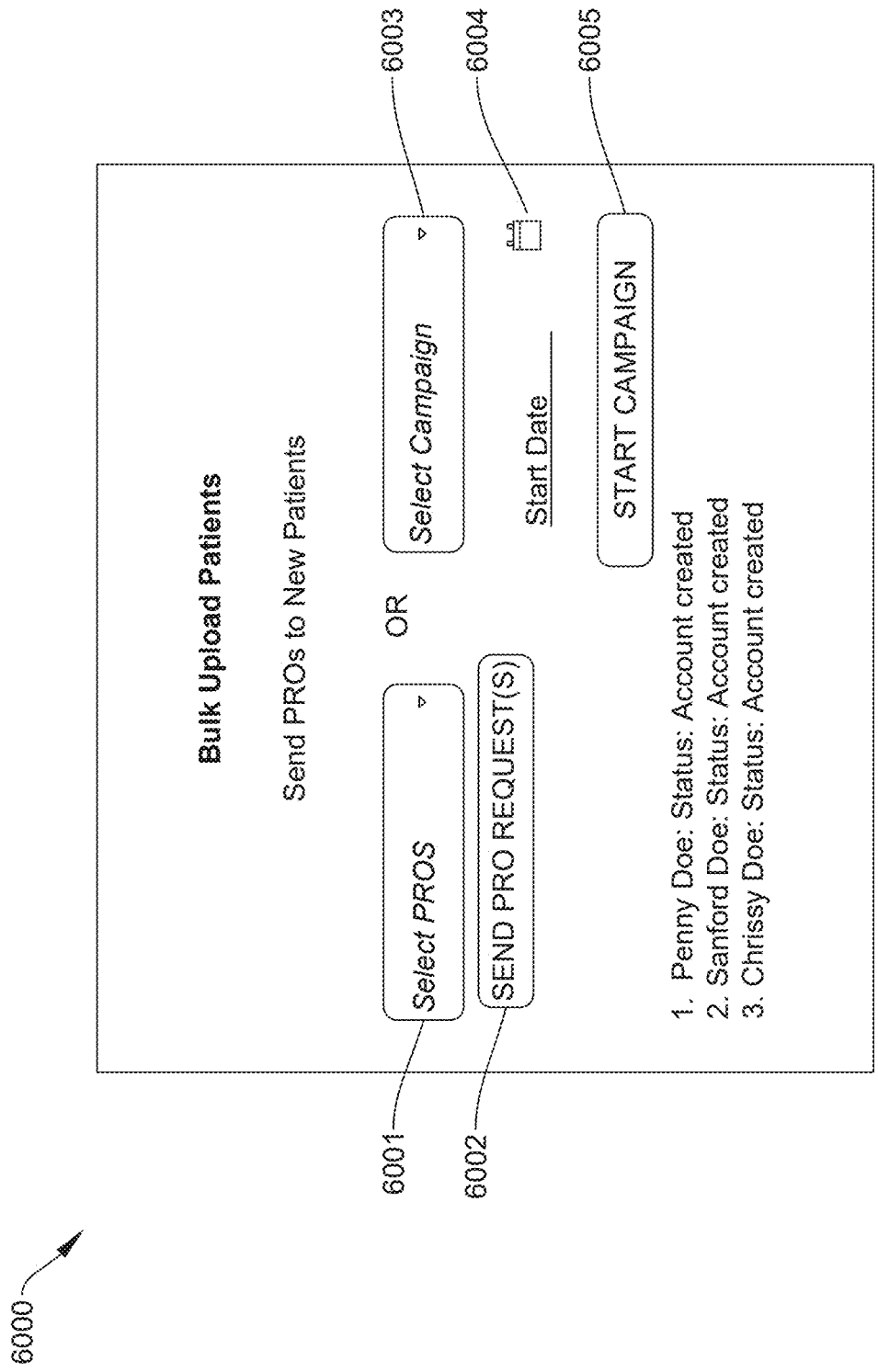
FIG. 6 shows a send PROs window 6000 non-limiting example according to some embodiments.

In some embodiments, the system is configured to generate a send PROs window 6000 upon selection of the bulk invite patients icon 4004. In some embodiments, a send PROs window 6000 comprises a select PROs menu 6001, a send PRO request(s) icon 6002, a select campaign menu 6003, a start date icon 6004, and a start campaign icon 6005. In some embodiments, a PRO request comprises a request for one or more image uploads for analysis by the AI algorithm. FIG. 6 shows a send PROs window 6000 non-limiting example according to some embodiments.

Figure 7:
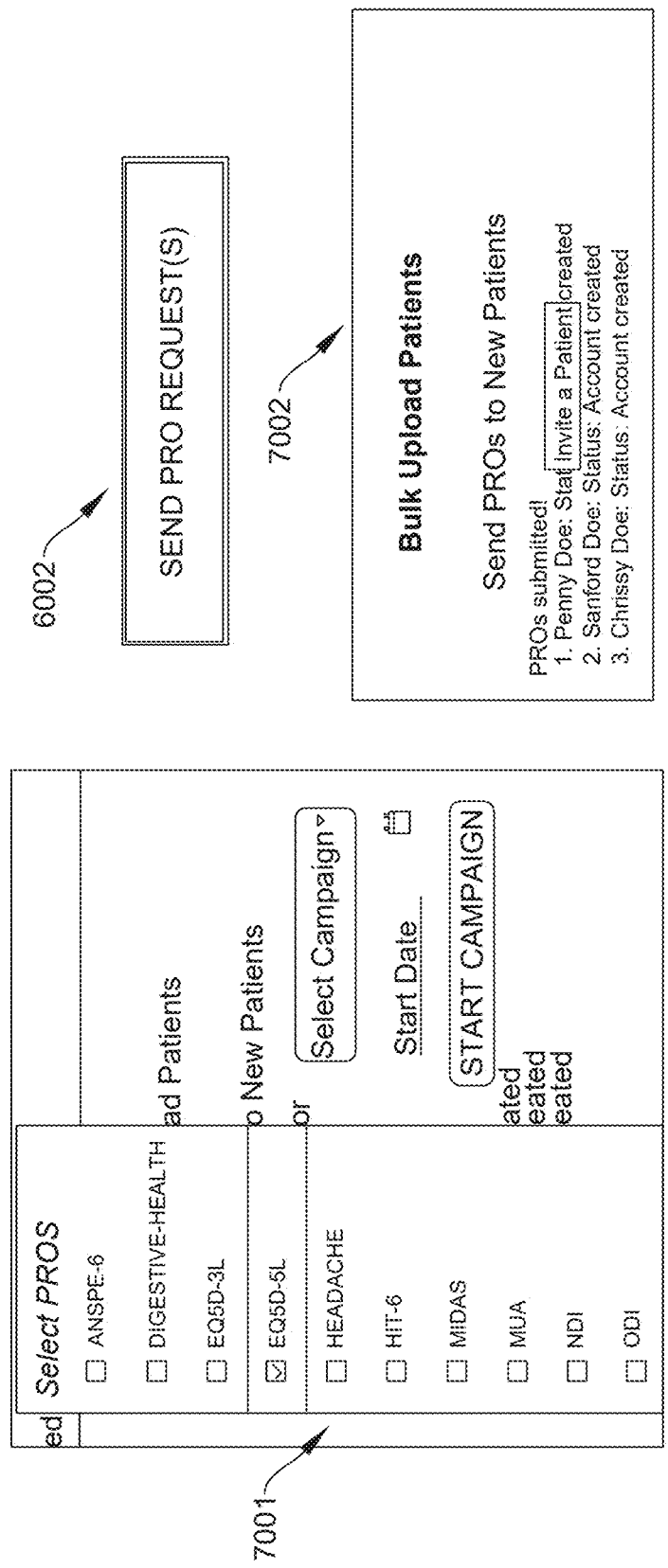
FIG. 7 shows a PROs confirmation window workflow according to some embodiments.

In some embodiments, the system is configured to generate a select PROs selection window 7001 upon selection of the select PROs menu 6001. In some embodiments, after one or more selections are made, selecting the send PRO requests(s) causes the one or more processors to generate a send PROs confirmation window 7002. FIG. 7 shows a PROs confirmation window workflow according to some embodiments. In some embodiments, selection of the select campaign menu 6003 causes the one or more processors to generate a select campaign selection window 8001 configured to enable a user to select a campaign type. FIG. 8 shows a campaign workflow according to some embodiments. In some embodiments, selection of the start data icon 6004 is configured to cause a calendar 8002 to be generated, where the calendar 8002 is configured to enable a user to initiate the campaign at any time in the future. In some embodiments, selection of the start campaign icon 6005 is configured to send the PRO campaign to one or more newly created patients.

Figure 9:
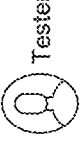
FIG. 9 shows a non-limiting example patient table GUI 9000 with populated with patient information according to some embodiments.
Figure 10:
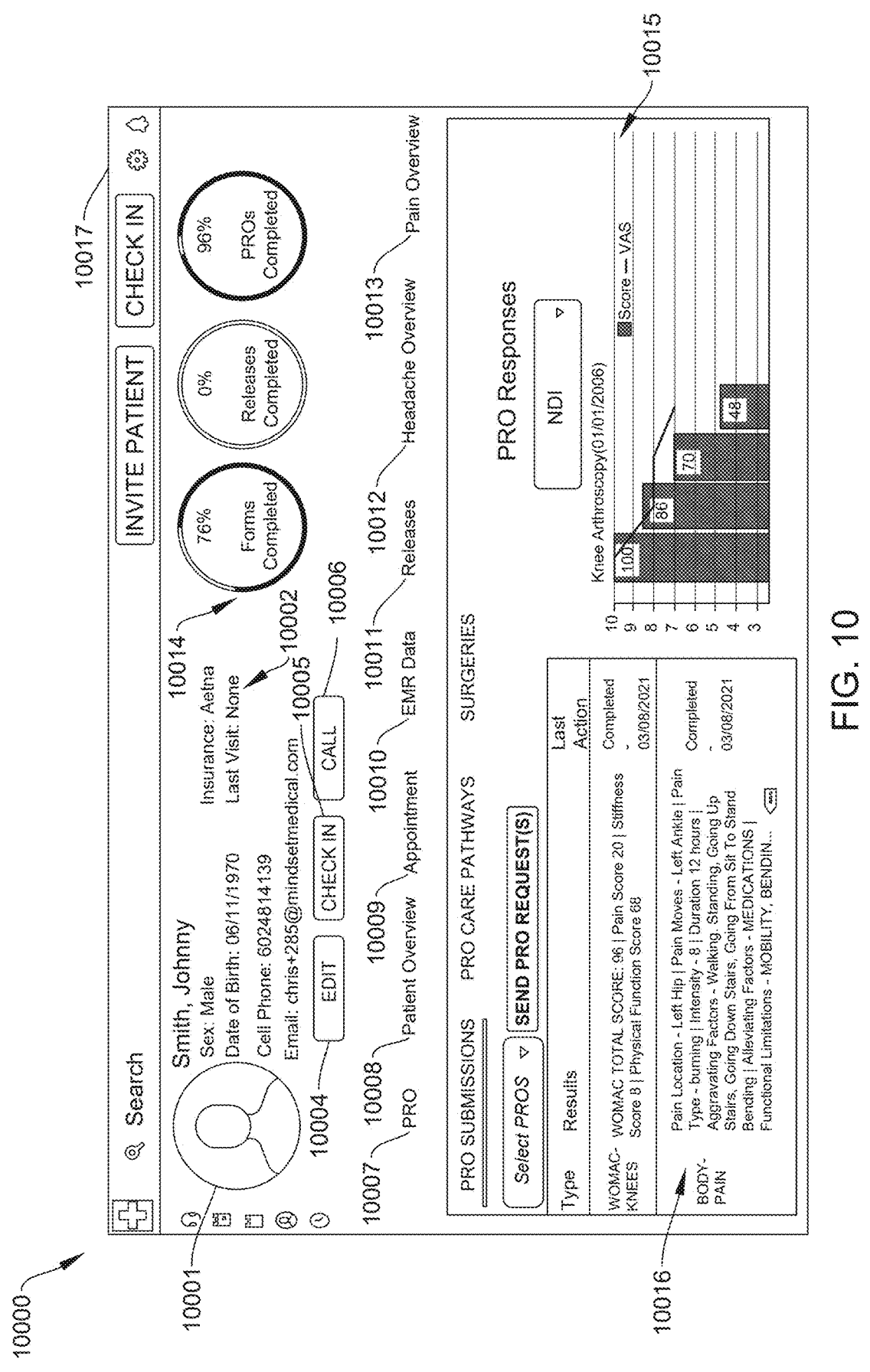

FIG. 9 shows a non-limiting example patient table GUI 9000 with populated with patient information according to some embodiments. In some embodiments, the patient table GUI 9000 is configured to display an alert 9001 when one or more forms (e.g., PRO forms) are not completed, thereby saving time and computer resources by limiting focus to only incomplete files. In some embodiments, one or more columns that include one or more of a patient name column 1011, an alerts column 1012, a date of birth (DOB) column 1013, a clinician column 1014, a check in/out column 1015, and a pain level column 1016 are sortable so further aid in the review process. In some embodiments, the system is configured to generate a patient record dashboard GUI 10000 upon selection of one or more patients 9002. FIG. 10 shows a non-limiting example patient record dashboard GUI 10000 according to some embodiments. In some embodiments, patient record dashboard GUI 10000 comprises one or more items displayed on patient invite dashboard GUI 3000.

In some embodiments, a patient record dashboard GUI 10000 includes one or more of a patient picture 10001, patient identifying information 10002, an edit icon 10004, a check in icon 10005, a call icon 10006, a PRO tab 10007, a patient overview tab 10008, an appointments tab 10009, an electronic medical record (EMR) data tab 10010, a releases tab 10011, a headache overview tab 10012, and a pain overview tab 10013. In some embodiments, the patient data entry overview 10014 is configured to display a completion rate for one or more patient requested documents and/or reports which include such non-limiting examples as one or more of forms completed, releases completed, requested images for AI analysis, and PROs completed. In some embodiments, a patient record dashboard GUI 10000 includes one or more PRO charts 10015. In some embodiments, the system is configured to generate, from one or more PRO responses, the one o more PRO charts displaying changes over time for one or more patient conditions. In some embodiments, a patient record dashboard GUI 10000 comprises a PROs overview display 10016.

Figure 12:
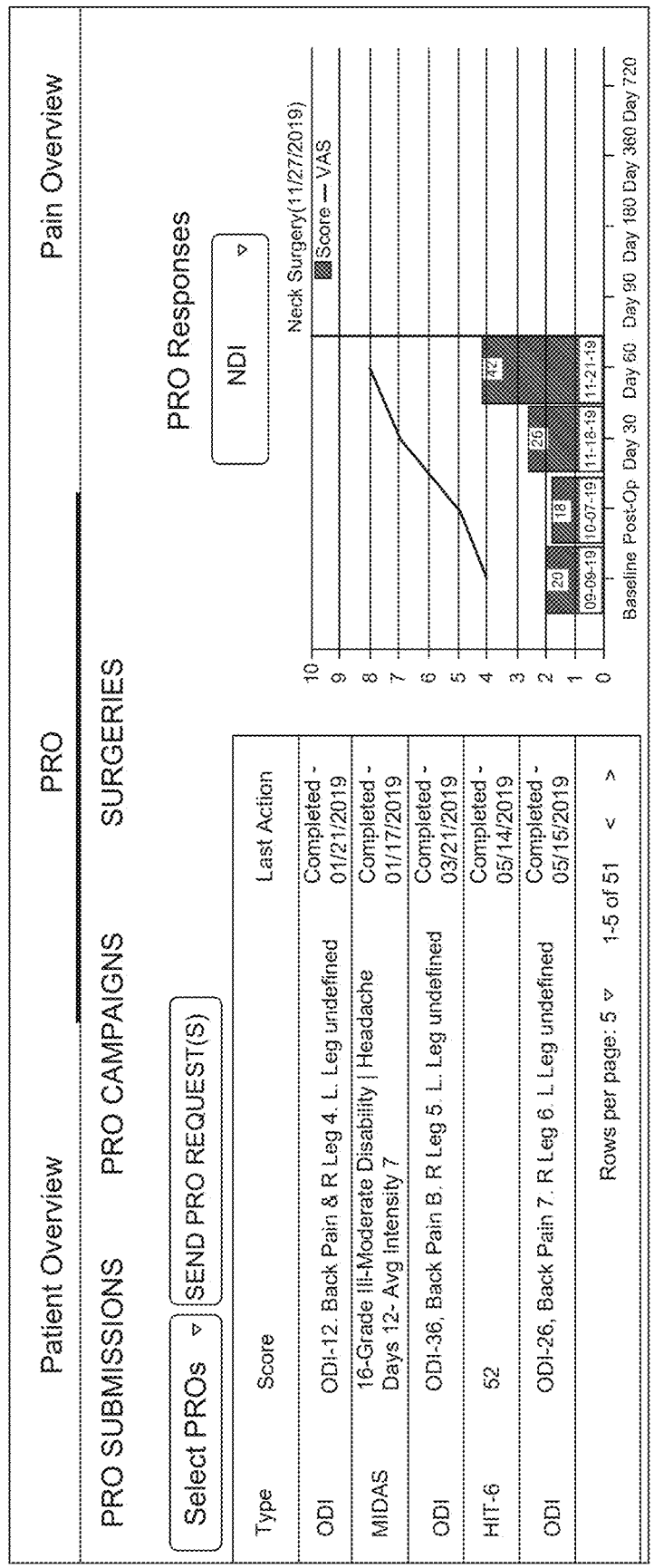
FIG. 12 depicts a PRO tab example layout 12000 according to some embodiments.

In some embodiments, selection of the edit icon 10004 causes the one or more processors to generate a GUI to enable a change of one or more patient entries. In some embodiments, a patient overview tab 10008 provides an overview of the patient based on the information submitted by the patient (e.g., in a system App configured to be installed on a client device), such as their symptoms, medication, and/or insurance information. FIG. 11 illustrates a patient overview tab layout 1100 according to some embodiments. In some embodiments, a PRO tab 10007 includes one or more of available PROs submissions, PRO campaigns, patient surgeries, and PRO responses. FIG. 12 depicts a PRO tab example layout 12000 according to some embodiments.

In some embodiments, the system is configured to generate a PRO selection list 13001 upon selection of the select PROs menu 12001. In some embodiments, the PROs menu 13002 is then updated with the selection by the system. In some embodiments, PROs overview display 10016 then displays the selection as well as the current status. FIG. 13 shows the PRO selection list process according to some embodiments. In some embodiments, the system is configured to generate a message (e.g., text message, email, voice call, etc.) and send the message to the patient. In some embodiments, the system is configured to send one or more reminder emails if there is incomplete action taken by the patient. In some embodiments, the system is configured to generate a resend icon on the PROs overview display 10016 to enable a user to manually resend the PROs.

In some embodiments, the system is configured to automatically display a graph of patient responses to ODI, NDI, and HIT-6 PROs on the PROs overview display 10016. FIG. 14 illustrates an NDI graph 14001, and ODI graph 14002 according to some embodiments.

Figure 15:
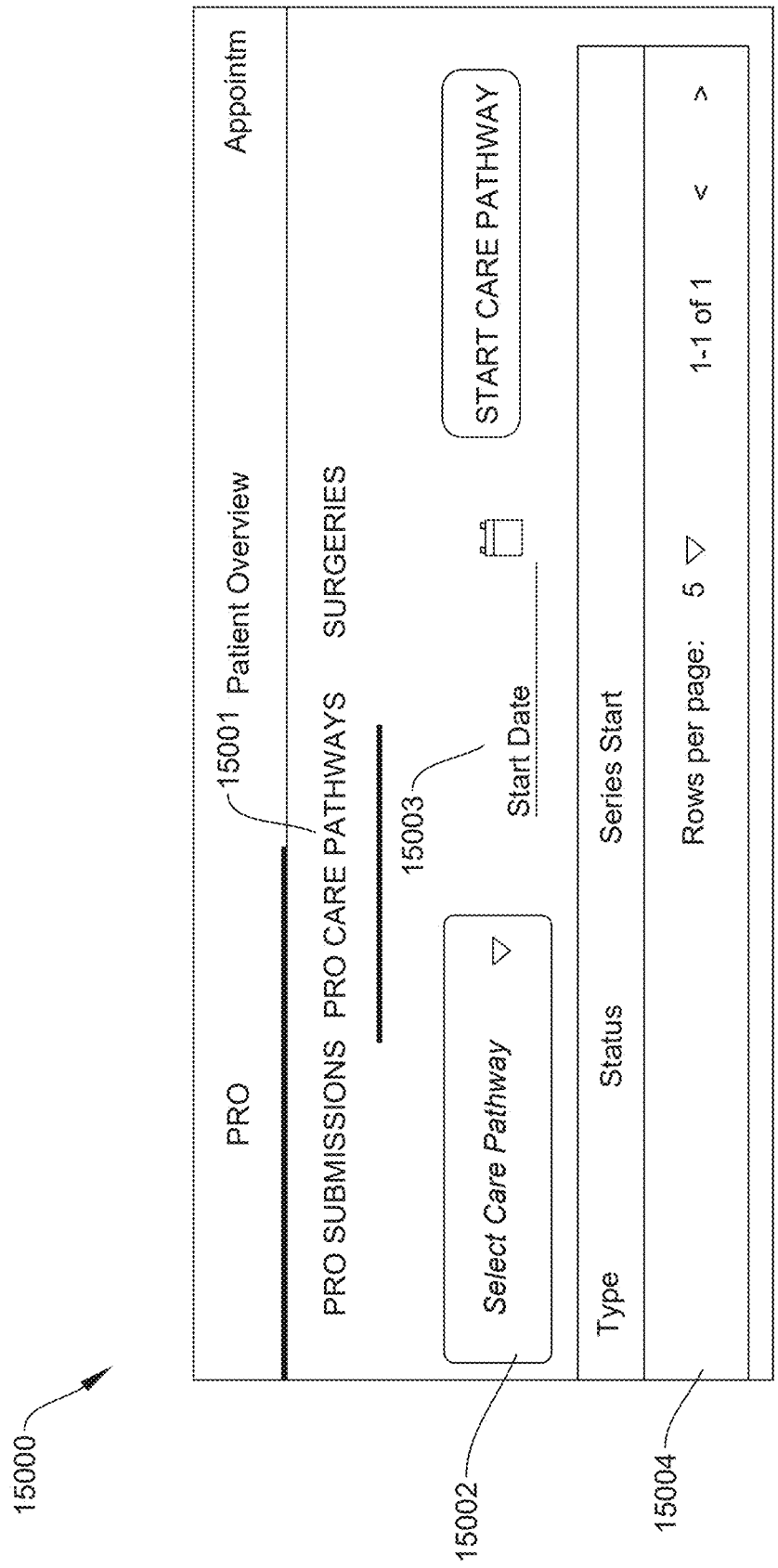
FIG. 15 shows a PRO care pathways tab 15000 with a select car pathway menu 15001 and care pathway table 15004 as part of the GUI according to some embodiments.
Figure 16:
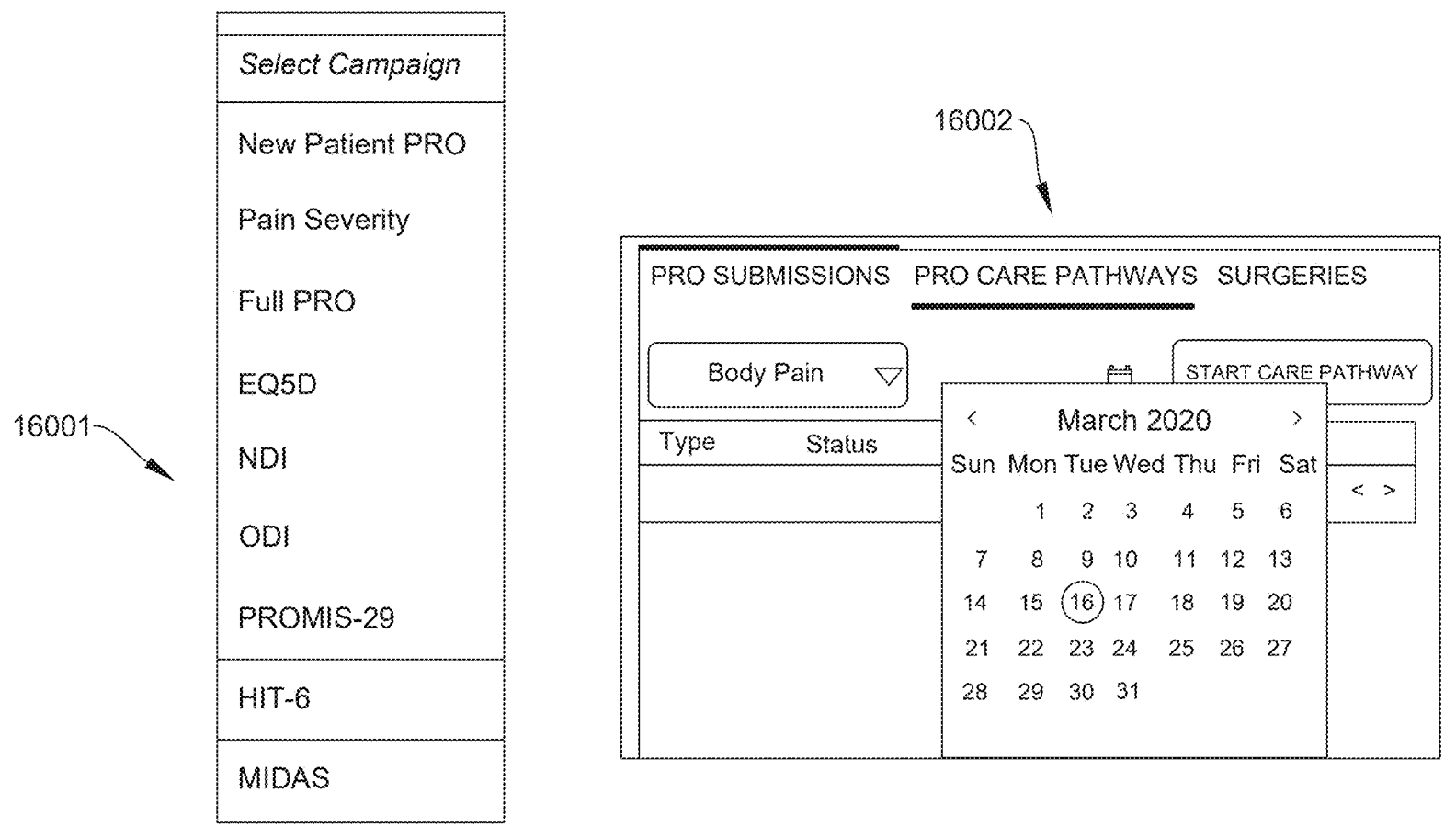

In some embodiments, a PROs overview display 15000 comprises a PRO care pathways tab 15000. FIG. 15 shows a PRO care pathways tab 15000 with a select car pathway menu 15001 and care pathway table 15004 as part of the GUI according to some embodiments. FIG. 16 shows a pathway list 16001 generated by the system upon selection of the select care pathway menu 15001, as well as a start data 15003 selection calendar 16002 according to some embodiments. FIG. 17 shows an updated care pathway table 17000 according to some embodiments. In some embodiments, the system is configured to generate a message (e.g., text message, email, voice call, etc.) and send the message to the patient to complete one or more pathway items including submission of images for AI analysis. In some embodiments, the system is configured to display a notification next to one or more tabs once a PRO has been completed.

Figure 18:
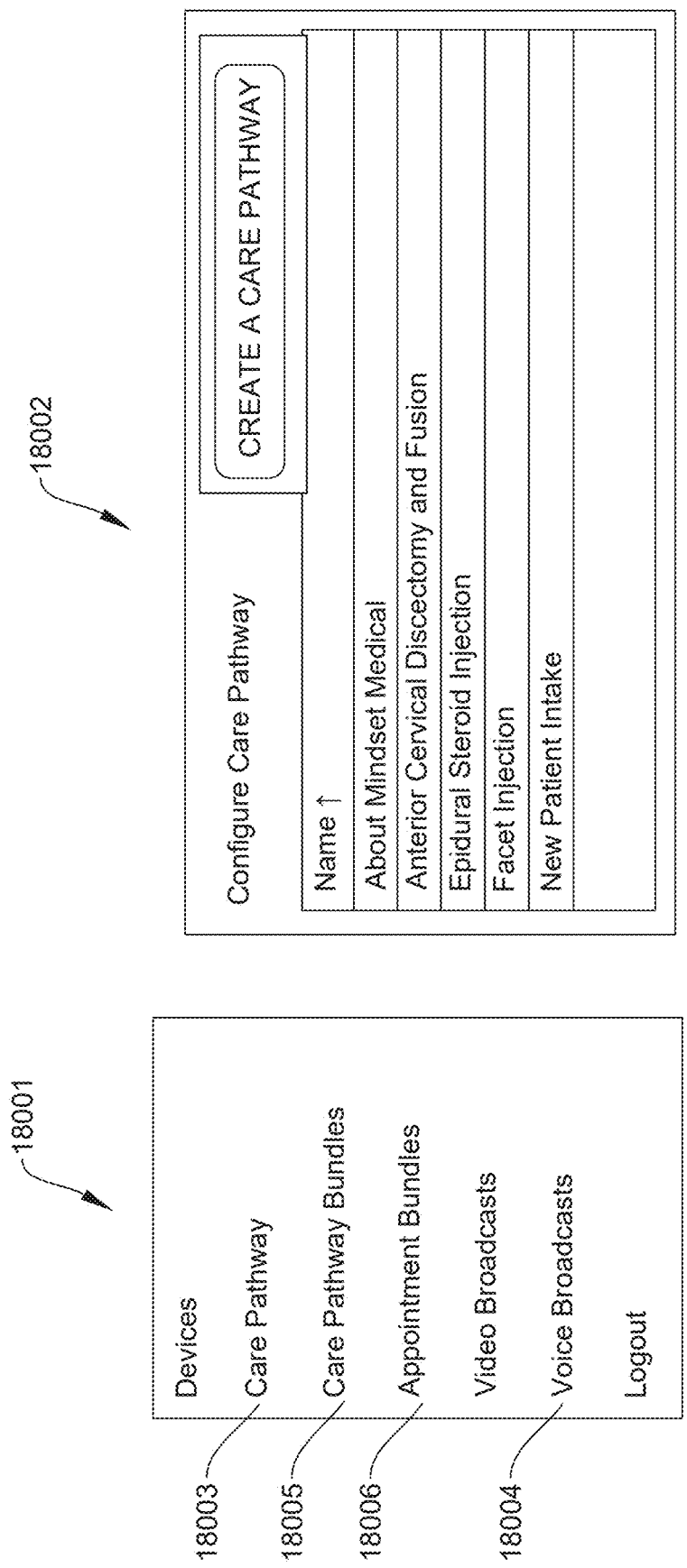
FIG. 18 shows an options menu 18001 after selection of the gear icon 10017 and a configure menu 18002 after selection of care pathway 18003.
Figure 19:
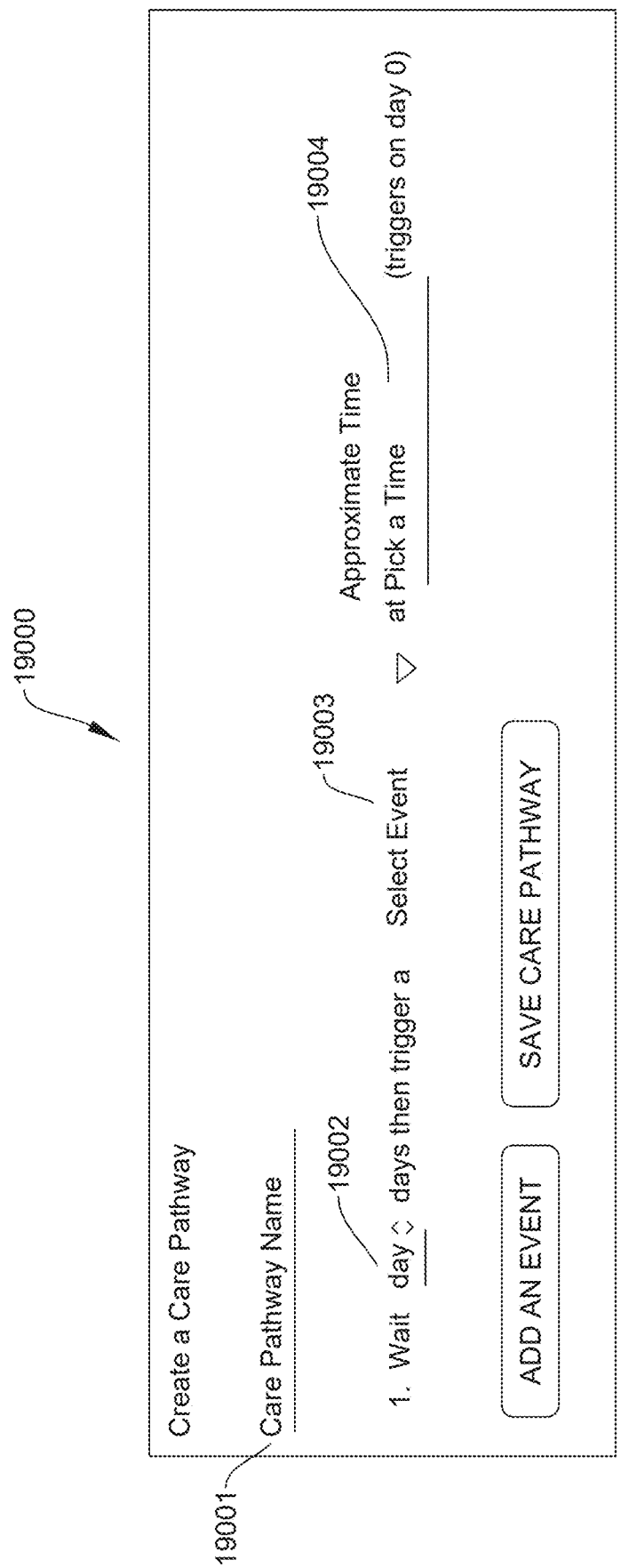
FIG. 19 shows a create a care pathway GUI 19000 according to some embodiments.

In some embodiments, the system is configured to enable creation of a custom PRO campaign. In some embodiments, selection of a menu icon (e.g., gear icon 10017) is configured to initiate the custom PRO campaign computer implemented instructions. FIG. 18 shows an options menu 18001 after selection of the gear icon 10017 and a configure menu 18002 after selection of care pathway 18003. FIG. 19 shows a create a care pathway GUI 19000 according to some embodiments. In some embodiments, create a care pathway GUI 19000 is configured to enable selection of one or more of a campaign name 19001, a wait time 19002, an event type 19003, and an execution time 19004. In some embodiments, the wait day 19002 shown in the non-limiting example is the day when the care pathway will start. In some embodiments, the event type 19003 in the non-limiting example enables a type of PRO to be selected. In some embodiments, the pick a time 19004 shows is configured to cause the one or more processors to send the PRO to a remote user client such as a mobile phone. In some embodiments, an entry of 0 will start the care pathway immediately. In some embodiments, an entry of 1 will start the care pathway the next day. In some embodiments, while an entry 2 will start the care pathway in two days and so on.

In some embodiments, options menu 18001 comprises a voice broadcast option 18004 which generates a voice broadcast GUI configured to enable a user to upload and audio file into a care pathway. In some embodiments, a video broadcast GUI is generated in the same manner, allowing the upload of video to the care pathway.

In some embodiments, the system is configured to enable a user to bundle multiple PROs into a single PRO campaign. In some embodiments, the system is configured to enable patients that receive a PRO campaign that contains a bundled event to respond to multiple PROs while authenticating one time (i.e., ODI and PHQ-9). In some embodiments, the options menu 18001 displayed after selection of the gear icon 10017 comprises a care pathway bundles link 18005.

Figure 20:
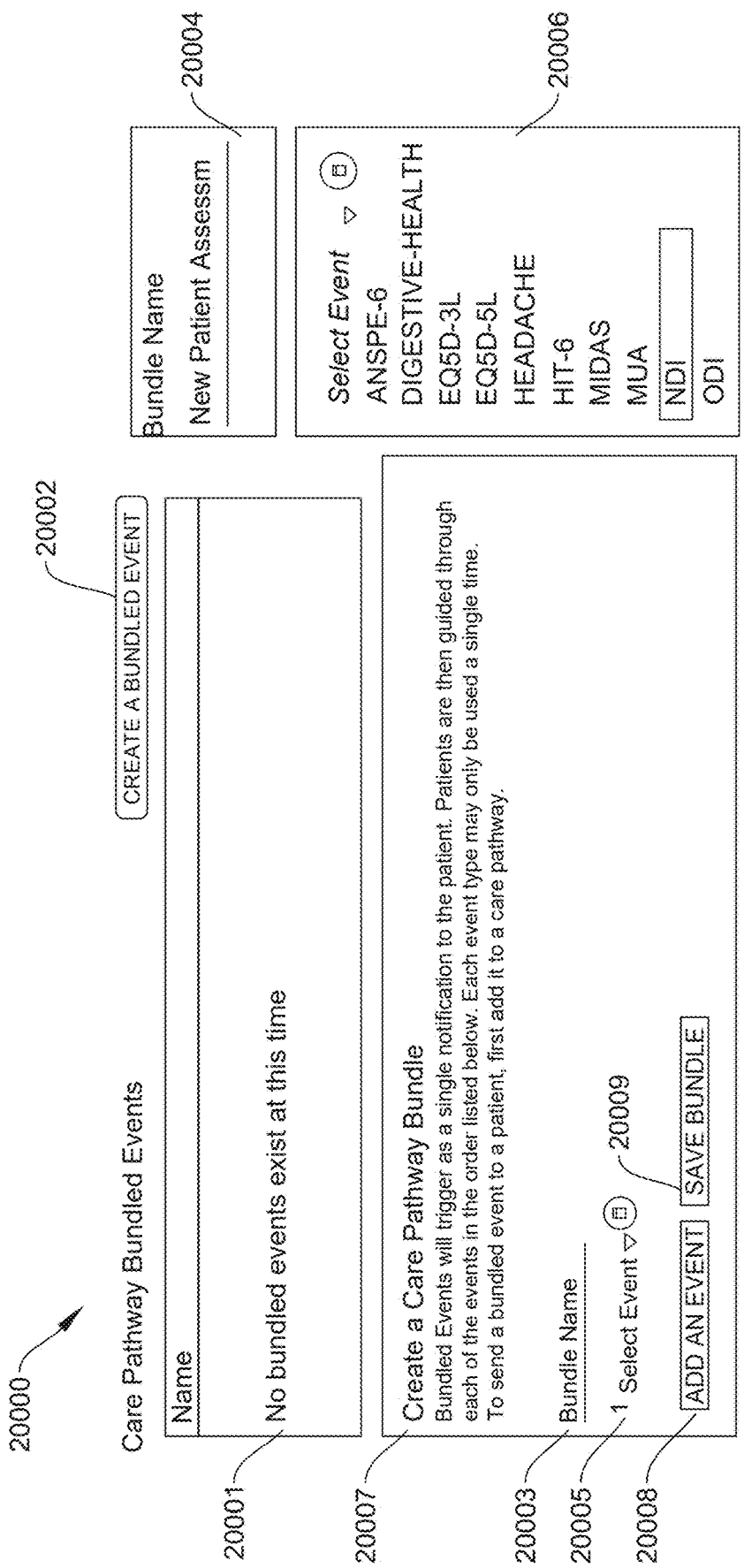
FIG. 20 shows system GUIs 20000 executed as part of the care pathway bundle according to some embodiments.

FIG. 20 shows system GUIs 20000 executed as part of the care pathway bundle according to some embodiments. In some embodiments, selection of the care pathway bundles link 18005 causes the one or more processors to generate a care pathway bundled events GUI 20001. In some embodiments, after selecting a create a bundled event link 20002 the system is configured to generate a bundle creation GUI 20007 that enables entry of a bundle name 20003 (such as example 20004) and event type selection 20005 (such as example 20006). In some embodiments, selecting the add event icon 20008 enables the process to be repeated resulting in multiple PROs. In some embodiments, once the care pathway is created selecting the save bundle icon 20009 saves the new bundle. FIG. 21 shows an updated care pathway bundled events GUI 21001.

Figure 22:
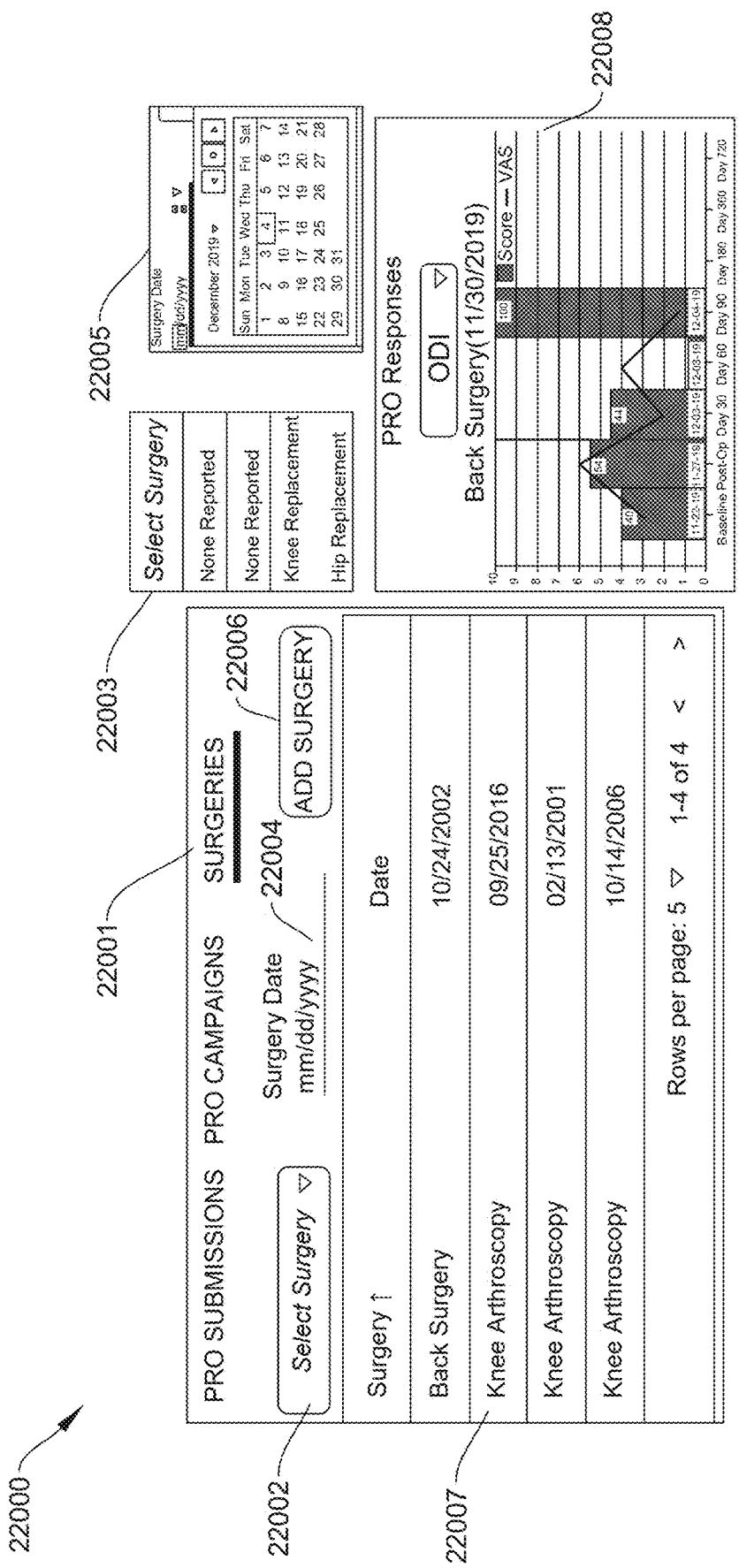
FIG. 22 shows GUIs generated by the system to add a surgery.

FIG. 22 shows GUIs generated by the system to add a surgery. In some embodiments, selection of the surgeries tab 22001 brings up the GUI 22000. In some embodiments, selecting the select surgery menu 22002 displays a surgery list 22003 configured to enable selection of a surgery. In some embodiments, selection of the surgery date 22004 displays a calendar 22005 where a date can be selected. In some embodiments, selecting the add surgery icon 22006 causes the surgery to be listed in the table 22007. In some embodiments, when a surgery is recorded for a patient, it will be displayed on the ODI or NDI graph 22008.

Figure 23:
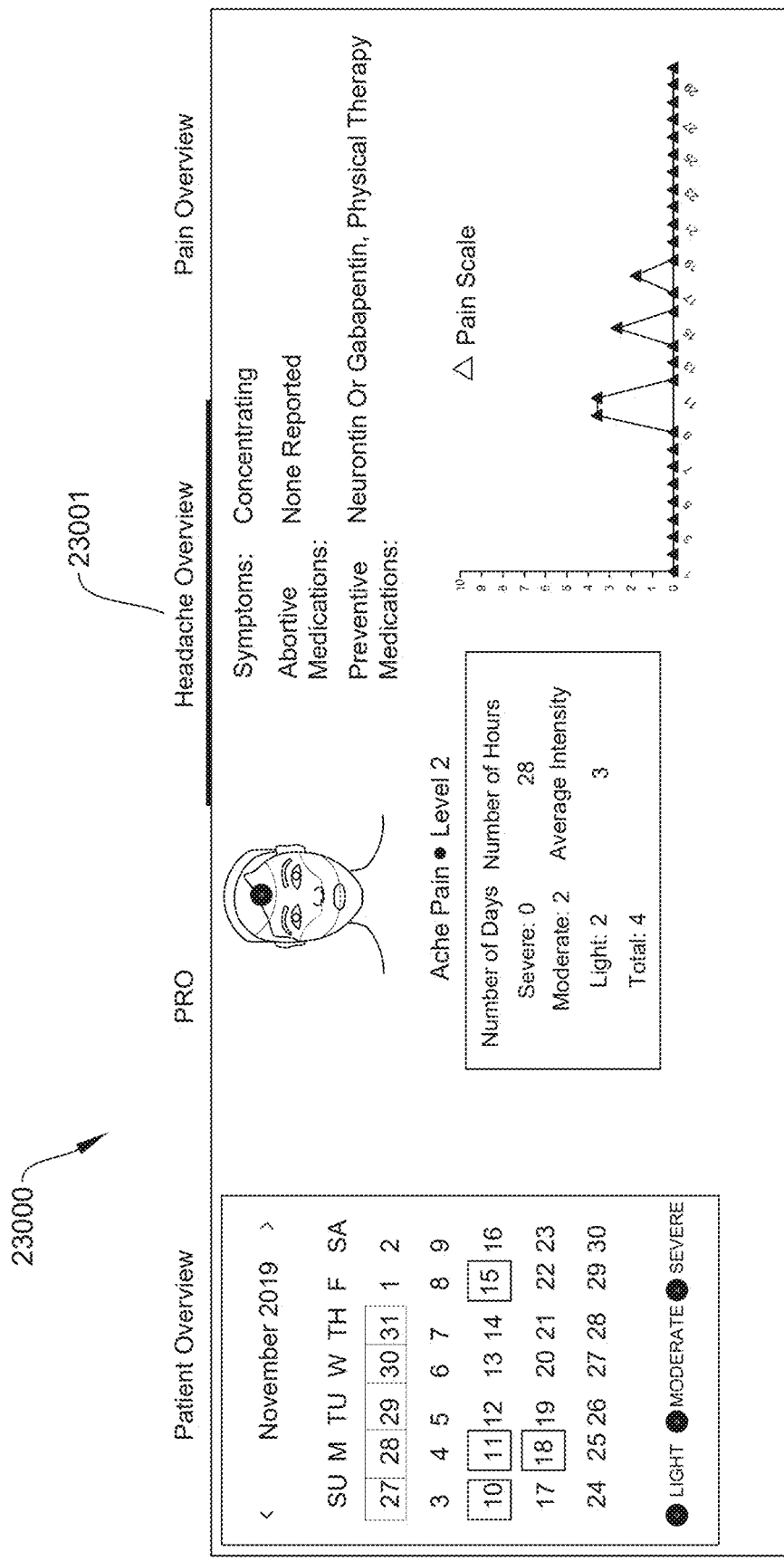
FIG. 23 shows a non-limiting example headache overview GUI 23000 according to some embodiments.
Figure 24:
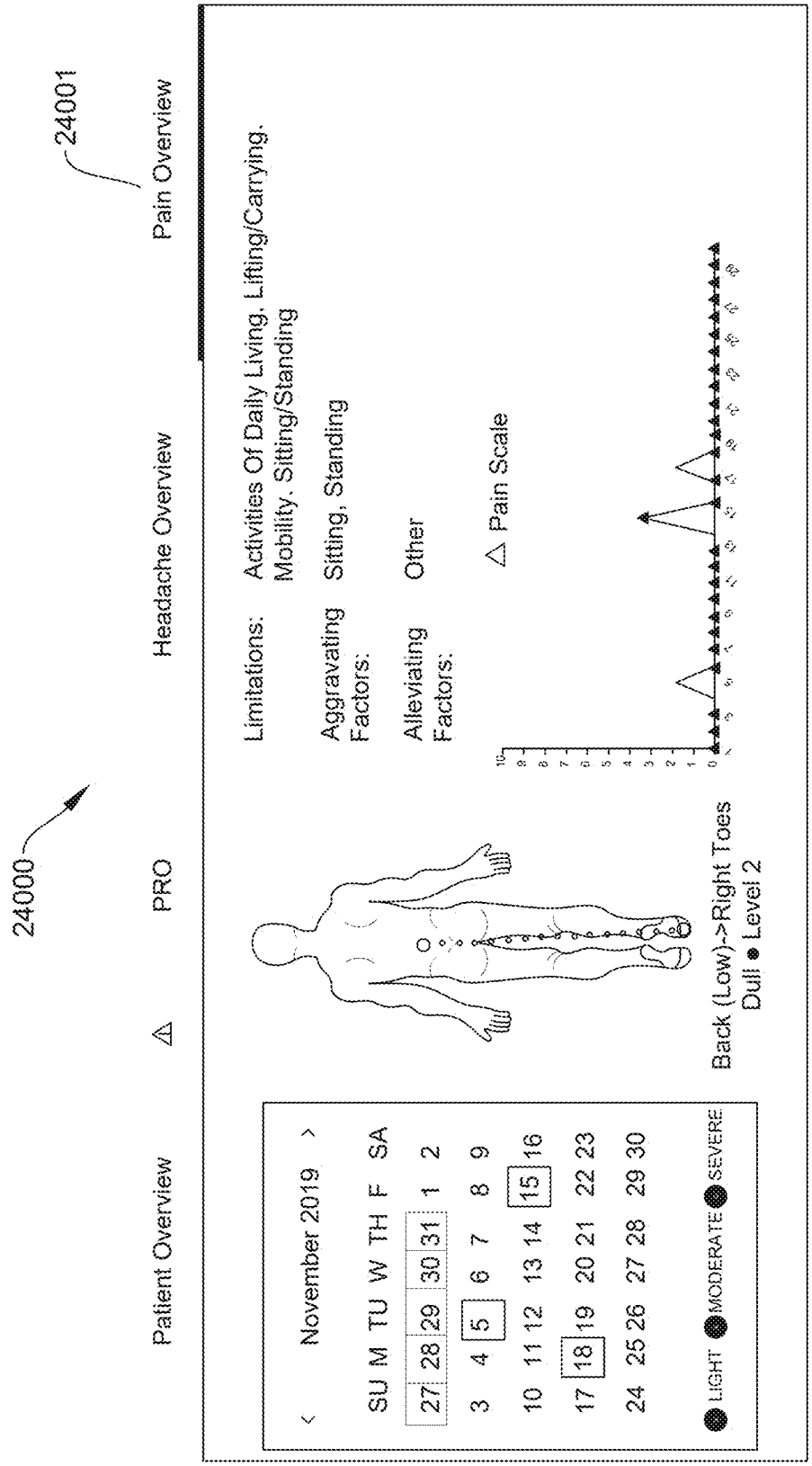
FIG. 24 shows a non-limiting example pain overview GUI 24000 according to some embodiments.

FIG. 23 shows a non-limiting example headache overview GUI 23000 according to some embodiments. In some embodiments, the headache overview tab 23001 displays the number of headaches the patient has logged for a given time period. FIG. 24 shows a non-limiting example pain overview GUI 24000 according to some embodiments. In some embodiments, the pain overview tab 24001 displays the number of pain events the patient has logged for a given time period. In some embodiments, when a patient submits a pain report, those dates are highlighted in the calendar view and/or color coded highlighted based on the pain severity. In some embodiments, clicking a date on the calendar will take a user to the patient pain information submitted for that day.

Figure 25:
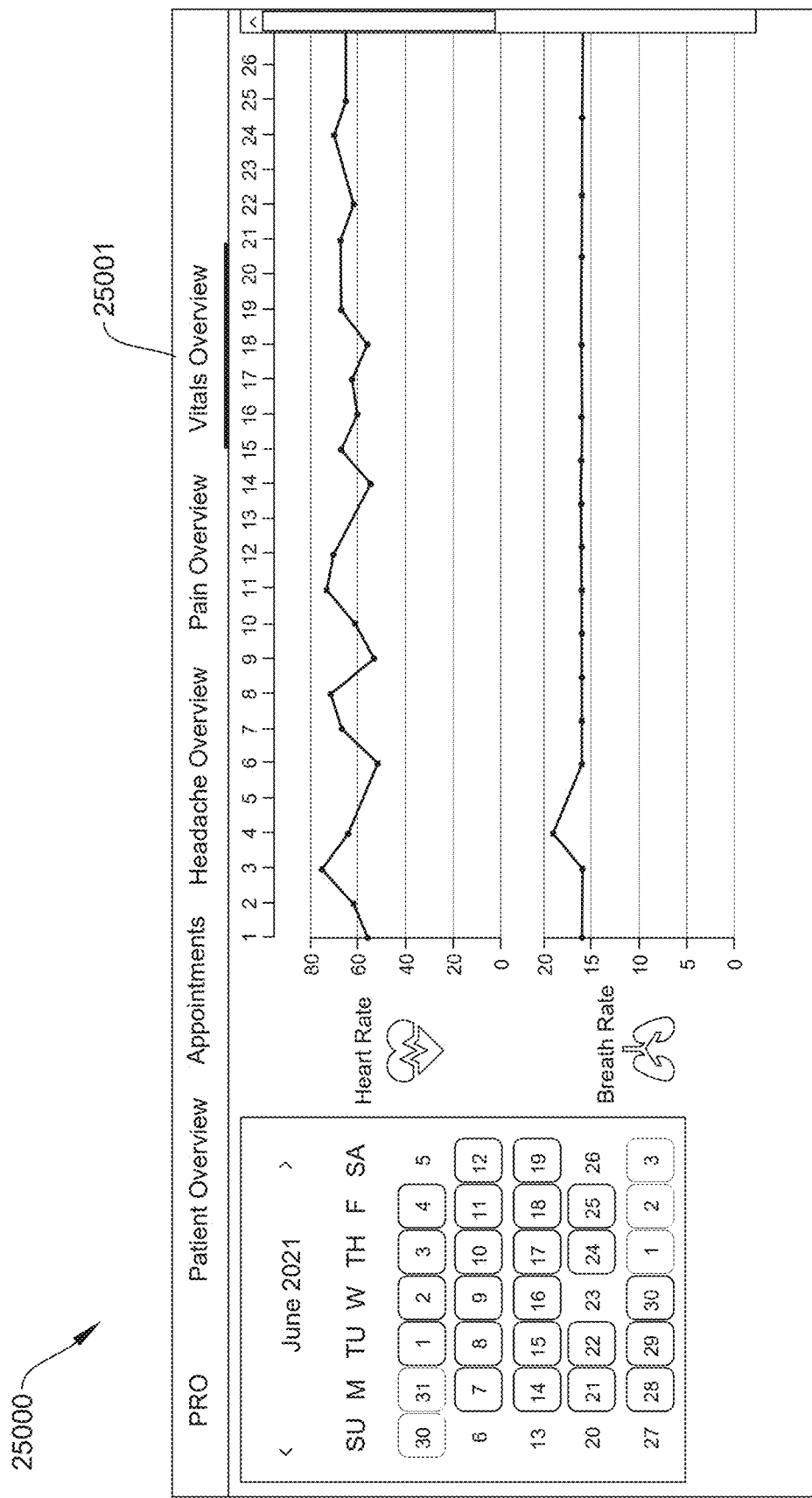
FIG. 25 depicts a vitals overview GUI 25000 according to some embodiments.
Figure 26:
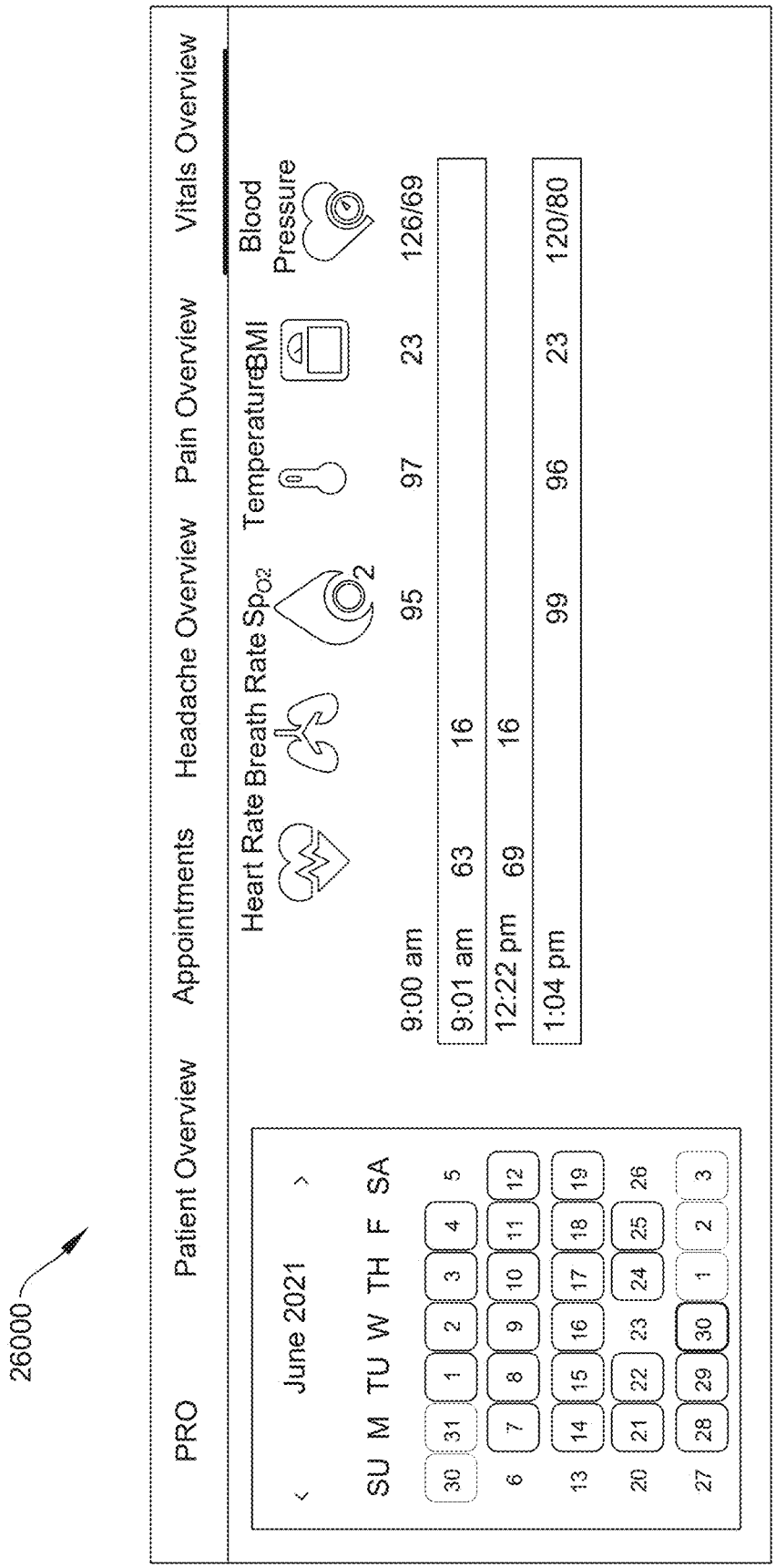
FIG. 26 shows a vitals measurement GUI after selection of a date on the calendar according to some embodiments.

FIG. 25 depicts a vitals overview GUI 25000 according to some embodiments. In some embodiments, selection of the vitals overview tab 25001 caused the vitals overview GUI 24000 to be displayed. In some embodiments, the vitals overview tab 25001 displays all the patient's vital signs measured as part of a virtual exam or as part of a remote patient monitoring assessment. In some embodiments, the scroll bar on the right can be used to view different vital measurements. In some embodiments, a highlighted date on the calendar means that the patient has recorded vital measurements for that day. In some embodiments, clicking on the date in the calendar will display the vitals measurements captured on that day. FIG. 26 shows a vitals measurement GUI after selection of a date on the calendar according to some embodiments.

Figure 27:
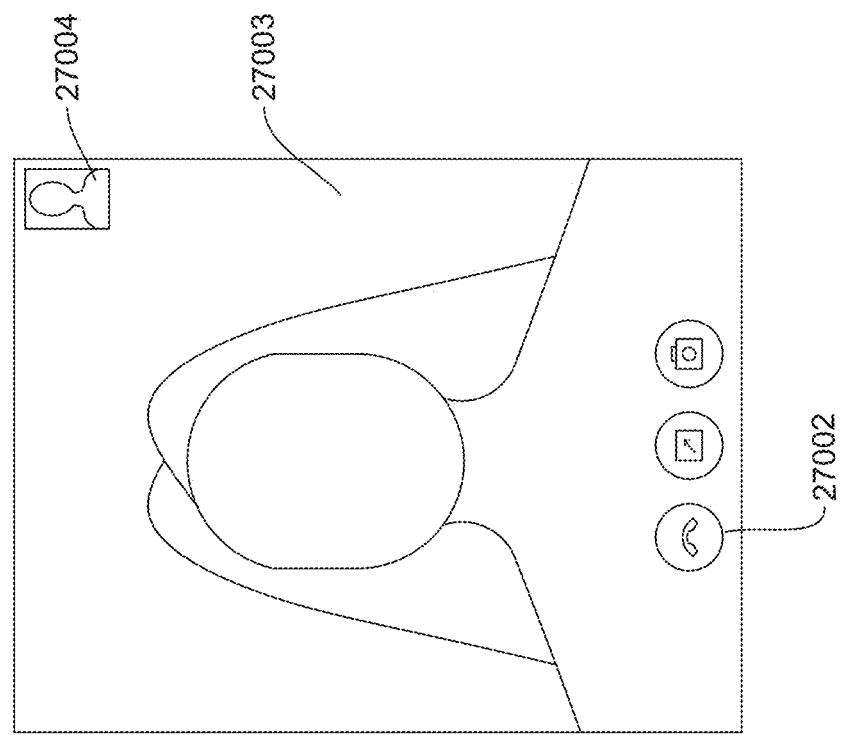
FIG. 27 illustrates an example virtual exam GUI 2700 according to some embodiments.

In some embodiments, the system is configured to record a patient's vital signs and/or changes in physiology measured during a virtual exam. FIG. 27 illustrates an example virtual exam GUI 2700 according to some embodiments. In some embodiments, selection of the save measurements icon 27001 cause the vitals and date to appear on the vitals overview GUI 25000. In some embodiments, the virtual exam GUI 2700 is configured to display the patient 27003 and medical professional 27004.

Figure 28:
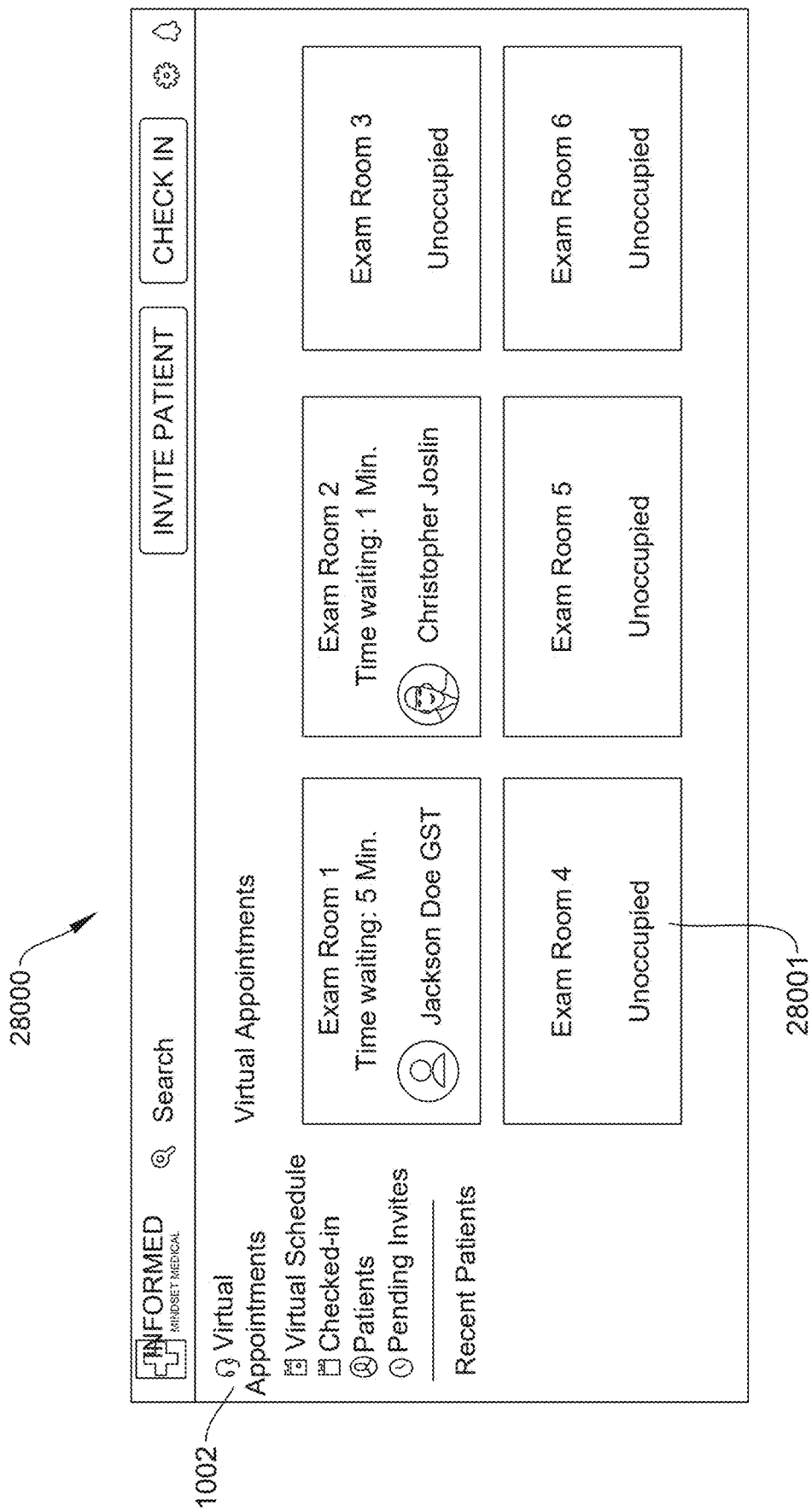
FIG. 28 shows a virtual appointment GUI 28000 according to some embodiments.
Figure 29:
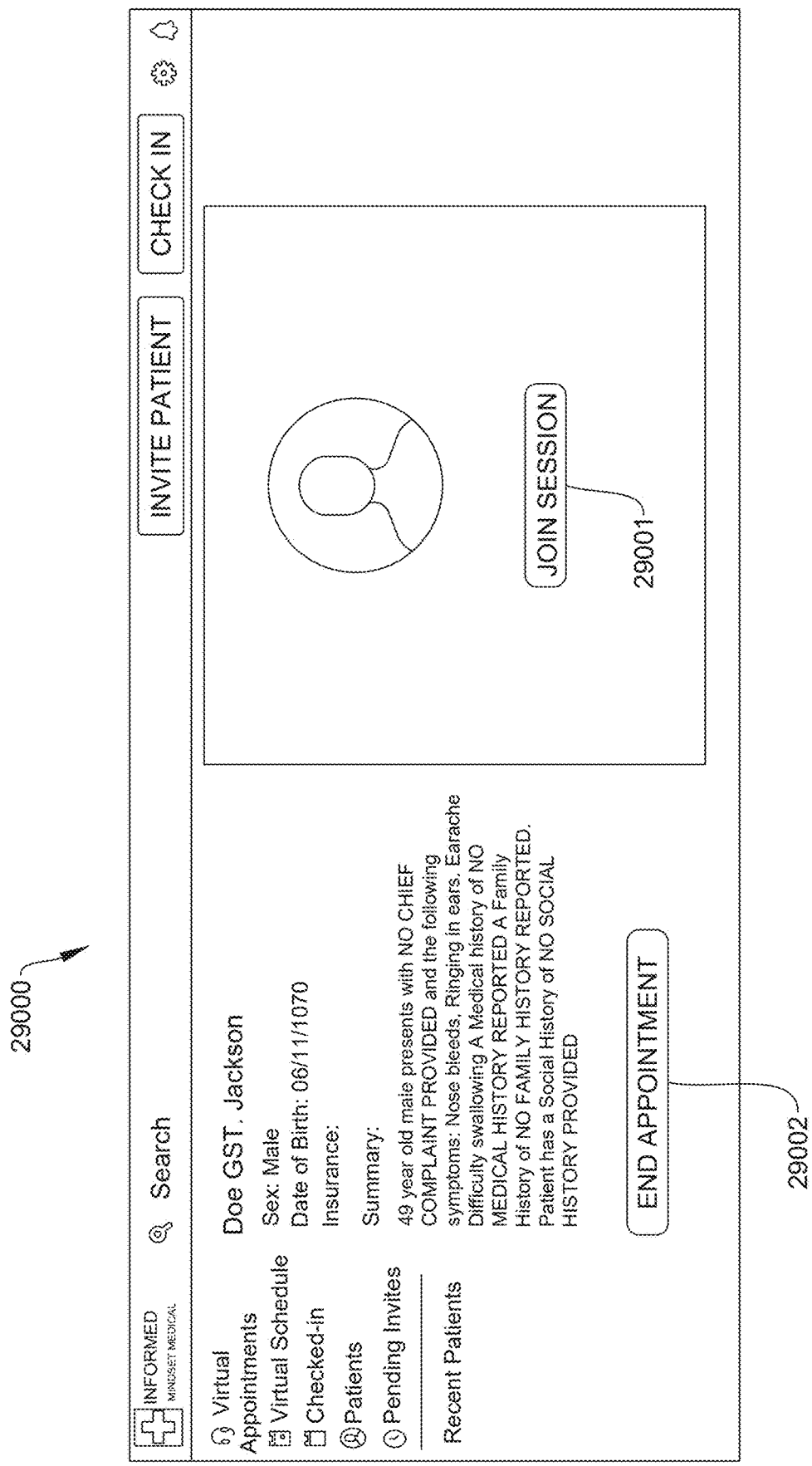
FIG. 29 shows a join session GUI 2900 according to some embodiments.

In some embodiments, selection of the virtual appointments icon 1002 is configured to generate a virtual appointment GUI 28000. FIG. 28 shows a virtual appointment GUI 28000 according to some embodiments. In some embodiments, virtual exam rooms are listed and display patients with providers, patients waiting, or empty. In some embodiments, the system is configured to enable joining an exam room by selecting the an exam room icon 28001. In some embodiments, the system is configured to display patient information in the virtual exam GUI 2700 once a medical professional joins the exam room 28001. FIG. 29 shows a join session GUI 2900 according to some embodiments. In some embodiments, to temporarily leave the room, the medical professional and/or patient can select the hold icon 27002. In some embodiments, the join session icon 29001 will return the medical professional and/or patient to the exam room. In some embodiments, the end appointment icon 29002 will end the session. In some embodiments, the provider can also initiate a virtual visit without scheduling an appointment. In some embodiments, selecting a call icon while on the patient profile page causes the one or more processors to execute instructions to send a notification to the patient (e.g., SMS text, email, etc.)

Figure 30:
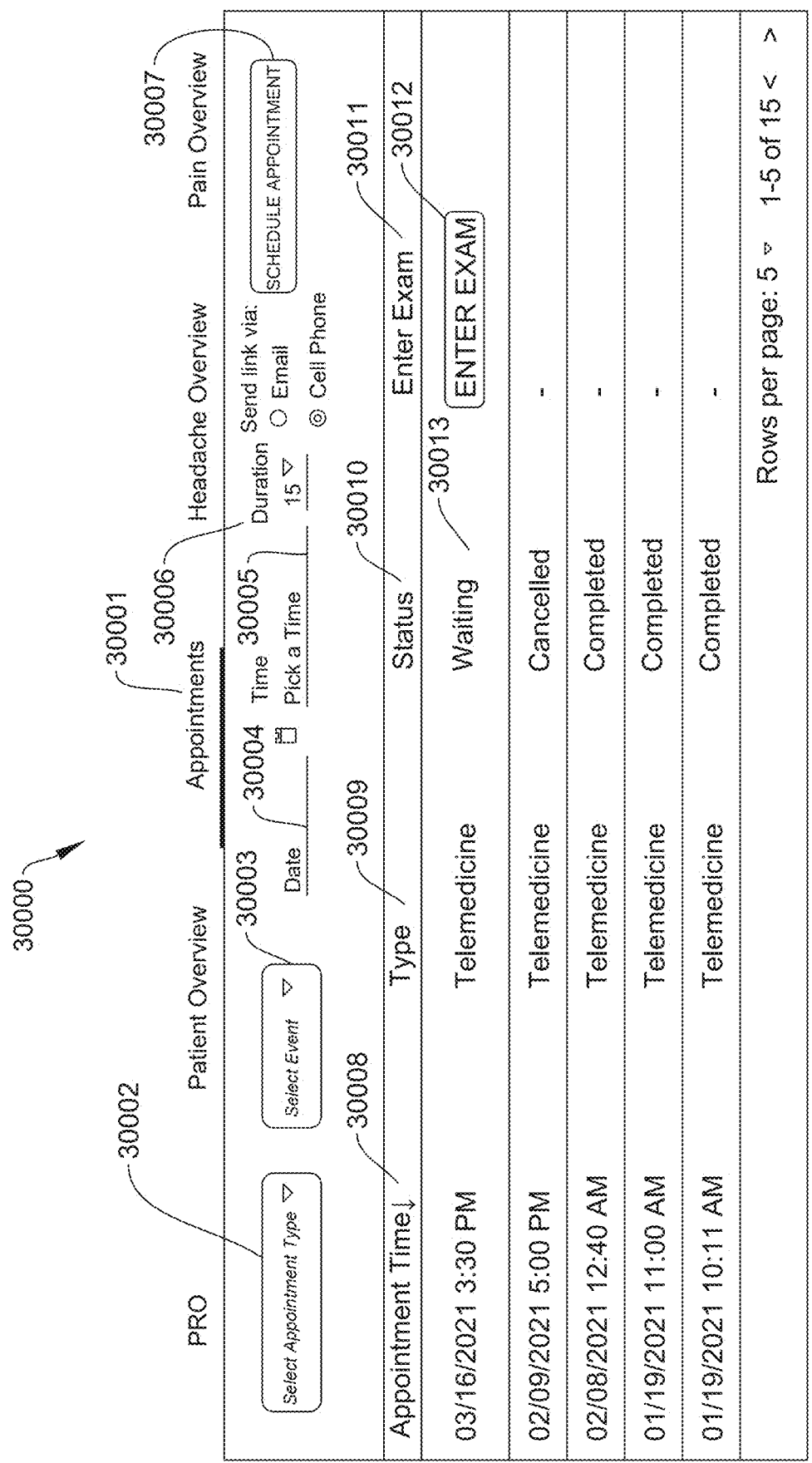
FIG. 30 shows a virtual appointment GUI 30000 according to some embodiments.

In some embodiments, section of the appointments tab 30001 generates a GUI that allows providers to schedule virtual healthcare consultations with patients and displays scheduled and completed appointments. FIG. 30 shows a virtual appointment GUI 30000 according to some embodiments. In some embodiments, to schedule a virtual appointment, the system is configured to enable a user to select the appointment type icon 30002. In some embodiments, patient intake forms or assessments can be sent to the patient along with the appointment. In some embodiments, the system is configured to enable a user to select the event icon 30003 to pick an intake form or assessment. In some embodiments, a date can be selected by clicking the date icon 30004. In some embodiments, a time can be selected by clicking the time icon 30005. In some embodiments, and appointment duration can be selected from the duration icon 30006. In some embodiments, to send the appointment notification, the schedule appointment icon 30007 can be selected. In some embodiments, the appointment table will update and reflect the scheduled appointment. In some embodiments, the appointment time column 30008 displays the time the patient has a virtual consultation scheduled. In some embodiments, the type column 30009 displays a telemedicine or in-person consultation. In some embodiments, the status column 30010 shows the current status of the appointment (Scheduled, Completed, or Cancelled). In some embodiments, the enter exam column 30011 displays a enter exam icon 30012 configured to let a clinician (medical provider) enter a virtual exam room when the patient is present. In some embodiments, a cancelation icon 30013 is configured to enable a medical professional to cancel the appointment.

Figure 31:
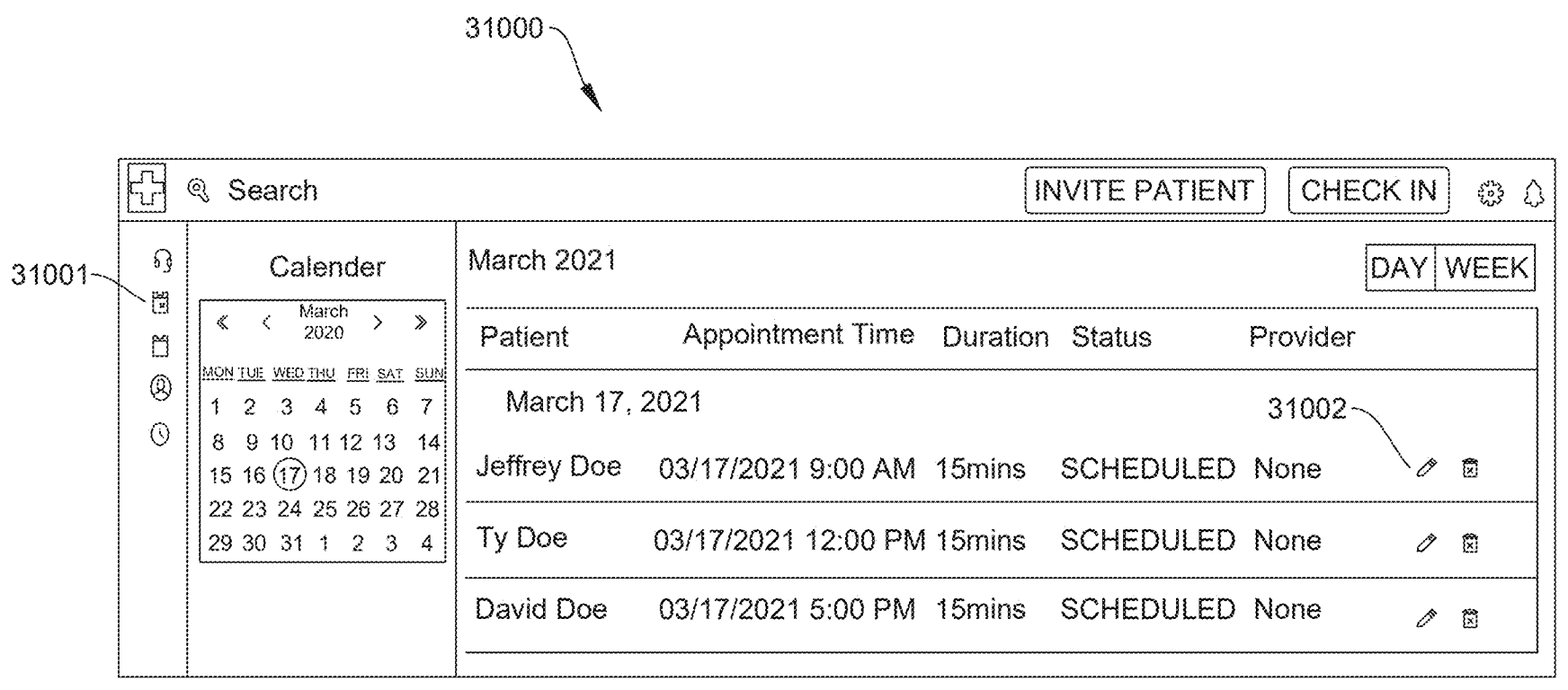

In some embodiments, the system is configured to generate a virtual schedule GUI 31000. FIG. 31 shows a virtual schedule GUI 31000 according to some embodiments. In some embodiments, clicking on the virtual exam calendar icon 31001 will show scheduled exams for different months. In some embodiments, the virtual schedule can be configured to show scheduled exams by month, day, or week. In some embodiments, a scheduled exam can be rescheduled using the edit icon 31002.

Figure 32:
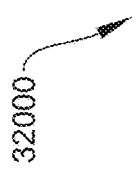
FIG. 32 illustrates a create appointment bundle GUI 32000 according to some embodiments.

In some embodiments, the system is configured create appointment bundles. In some embodiments, like care pathways, the system is configured to enable a user to create appointment bundles by selecting the appointment bundles link 18006 to send patient intake and pre-exam assessments as part of a scheduled virtual exam. In some embodiments, appointment bundles are sent to the patient via SMS/Text message as soon as the exam is scheduled. FIG. 32 illustrates a create appointment bundle GUI 32000 according to some embodiments.

Figure 33:
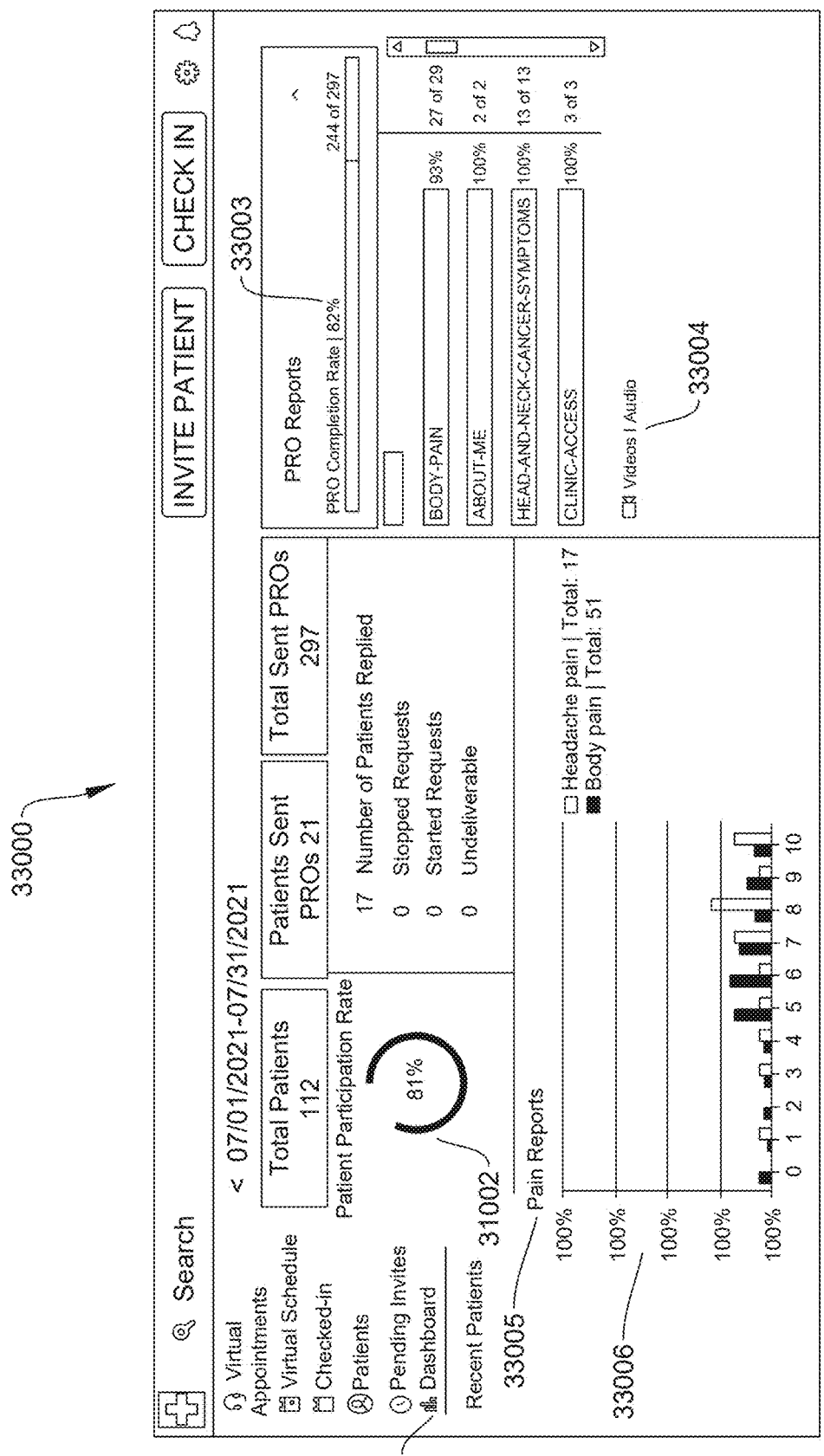
FIG. 33 illustrates a clinic dashboard GUI 33000 according to some embodiments.

FIG. 33 illustrates a clinic dashboard GUI 33000 according to some embodiments. In some embodiments, In some embodiments, the system is configured to display the clinic dashboard GUI upon selection of the dashboard icon 33001. In some embodiments, the clinic dashboard GUI 33000 comprises one or more provider metrics used for clinic-level key performance indicators (KPIs). In some embodiments, the clinic dashboard 33000 is configured to display the results of one or more AI algorithm analysis determinations. In some embodiments, clinic dashboard GUI 33000 is configured to automatically display the following KPIs for the a specified time period: Patient Participation Rate 33002; PRO Completion Rate 33003; Video/Audio Compliance 33004; and/or Pain Reports 33005.

In some embodiments, the Patient Participation Rate 33002 is determined using the total number of patients sent PRO's and the number of patients that replied. In some embodiments, the dashboard also displays metrics for total patients and total sent PROs. In some embodiments, details for other factors influencing patient participation are shown for stopped requests, started requests, and undeliverable requests.

In some embodiments, the PRO Completion Rate 33003 is determined using the total number of completed PROs and the total number of PROs the clinic has sent. In some embodiments, the response rates for individual PROs are also calculated using the total number of times the PRO was sent and the total number of responses. In some embodiments, each of the clinic's PROs are listed under the PRO Reports and the response rates are shown for each one. In some embodiments, the full list of PROs and response rates can be viewed using the scroll bar on the right.

In some embodiments, the Video/Audio Compliance 33004 displays the number of video and audio messages sent to patients along with the number of total video and audio messages that are viewed. In some embodiments, the clinic dashboard GUI 33000 displays the duration of each view/listen for each type of message.

In some embodiments, the Pain Reports 33005 are configured to display a chart 33006 that represents the distribution of the total number of responses for each pain value reported from completed headache pain and body pain assessments. In some embodiments, the reported values are distributed along the x-axis and the y-axis represents the percent of patients reporting that value. In some embodiments, each bar represents the percentage of patients responding to that pain value using the scores from completed assessments.

In some embodiments, one or more graphical user interfaces described herein are part of a system that includes remote medical assessment software for analyzing one or more medical conditions. In some embodiments, the system comprises one or more computers comprising one or more processors and one or more non-transitory computer readable media, the one or more non-transitory computer readable media comprising instructions stored thereon that when executed cause the one or more computers to implement the one or more GUIs and an artificial intelligence (AI) algorithm. As used herein, a reference to AI includes a reference to one or more subsets of AI including, as non-limiting examples, neural networks, deep learning, and machine learning. In some embodiments, information received by the system via the one or more GUIs is analyzed by the AI algorithm to determine if an abnormal condition associated with an area of skin in progressing toward healing and/or is getting worse.

In some embodiments, the system is configured to use the AI algorithm for orthostatic homeostasis vital monitoring and wound care. Orthostatic homeostasis is the measurement of the body's total mass. In some embodiments, the AI algorithm is configured to perform a wound healing analysis. In some embodiments, the AI algorithm is configured to determine distinct phases of wound healing. In some embodiments, distinct phases include one or more of hemostasis, inflammatory, proliferative, and maturation. In some embodiments, each phase has their own identifying characteristics (color changes, changes in the size of the wound, wound margins, temperature changes, etc) that can be captured and uploaded to the system utilizing commercially available camera technology. In some embodiments, the images (e.g., pictures, videos, infrared, etc.) are captured during a remote consultation in a virtual exam room as described above. In some embodiments, the images are uploaded in response to one or more PROs as described above. Suitable image capturing cameras include smartphones and webcams according to some embodiments.

In some embodiments, the system is configured to user the images to predict if an abnormal condition (e.g., wound, edema) is progressing toward healing, at risk for infection or non-healing by using "markers" as on and/or around the patient's wound as fiducials during a virtual visit and/or from an upload as described above. In some embodiments, changes in these markers such as one or more as dimension, serial color, as well as other indirect measures of perfusion and healing, identified through multiple pictures/videos during multiple virtual visits (telemedicine) result in a determination of healing progression. In some embodiments, the system is configured to aid in wound care, where another application is the monitoring of patients for edema in the ankles, which is a sign of congestive heart failure.

In some embodiments, the system includes a wound healing progress assessment. In some embodiments, at the first assessment after surgery, a baseline picture/video is taken of the wound (e.g., using a smartphone or other camera) and the medical assessment software automatically identifies unique areas of interest (hair follicles, skin features, freckles, moles, etc.) to be used as permanent fiducials. In some embodiments, the AI algorithm is trained using images of abnormal conditions (e.g., wounds, edema) on which permanent fiducials have been identified manually. The computational model is configured to discern between a surgical wound and normal hair, freckles, scars, tattoos, moles, bumps, depressions, veins, joints, muscle shape, teeth, eyes, nose, ears, skin folds, and fingernails, or other features.

In some embodiments, the AI algorithm automatically assess and identify the wound edge. In some embodiments, edge detection will be enabled through an image processing and AI approach, wherein thresholding is used to detect the color contrast at the edge of the wound, and the exact location of the edge is further adjusted through an AI model that is trained using photos of wounds with edges manually identified. In some embodiments, the AI algorithm is configured to determine one or more of wound length, wound width, wound area, wound margin width, within wound coloration, surrounding wound coloration, within wound dryness, within wound flakiness, surrounding wound dryness, and surrounding wound flakiness.

In some embodiments, if there is no ability to use skin uniqueness as a "fiducial" marker, then a temporary marker/fiducial is placed above and below the wound (or in some consistent manner) to be temporary. Temporary fiducials could be materials such as one or more of stickers, stickers with colorized regions to standardize the color characteristics of a wound and account for different lighting, ink marks, henna marks, and temporary tattoos as non-limiting examples. In some embodiments, the system is configured to calibrate an image (e.g., a first, second, or subsequent image) to determine dimension and/or ambient conditions. In some embodiments, to calibrate image dimensions, the pixels per mm are determined by image processing. In some embodiments, calibration can be achieved by determining pixels per mm of, as non-limiting examples, one or more of circular stickers with known diameter, rectangular stickers with grids having known dimensions, ink or henna marks placed with a template of known dimensions or a measurement device (e.g. a ruler), and a ruler placed into the camera view during calibration.

In some embodiments, at each subsequent time point, new photos are normalized based on the original baseline photo and fiducials. In some embodiments, normalization includes adjusting image dimensions and orientation so that the new image is in the same coordinate system as the original image for analysis. In some embodiments, normalization includes color and light adjustments based on colorized fiducial stickers and/or permanent features on the skin, where optical filtering is applied to ensure that all images have similar lighting.

In some embodiments, the AI algorithm is configured to determine changes in wound size by comparing between images one or more changes in wound length, wound width, wound area, wound margin width, within wound coloration, surrounding wound coloration, within wound dryness, within wound flakiness, surrounding wound dryness, and surrounding wound flakiness. In some embodiments, the AI algorithm is configured to determine one or more of if a wound is heading toward infection, an amount of perfusion, estimated from neural networks modeling using coloration and other factors from the images, whether the wound is healing normally (i.e., following a healing stage progression), the rate of wound healing, the estimated date of full healing, and any need for intervention (e.g., ER, in person visit, telemedicine appointment, etc.).

In some embodiments, the AI algorithm is configured to includes patient entered parameters (e.g., from one or more PROs, during a remote consultation, etc.) such as body temperature from a thermometer, noticeable odor, pain score, wound drainage, and/or other characteristics. In some embodiments, the system is configured to enable a GUI to upload infrared images. In some embodiments, the system is configured to combine infrared images with visible light images to provide additional detail on the appearance and size of different regions of the wound, providing more details to the AI algorithm. In some embodiments, infrared intensity can be used to assess the temperature of the wound.

In some embodiments, the AI algorithm is configured to provide an ankle edema assessment. In some embodiments, at the first assessment, a baseline image is taken of one or more ankles (with the patient standing in some embodiments) using a smartphone or other camera. In some embodiments, the medical assessment software automatically identifies the outline of one or more ankles. In some embodiments, the system includes a calibration as previously described. In some embodiments, the image may be taken with the patient standing on or near a calibration grid of known dimensions to help accurately calibrate the image. In some embodiments, the AI algorithm is configured to assesses the initial size of the ankles and compares to a database of healthy ankles to evaluate initial status of edema.

In some embodiments, over time, the patient takes new photos or video of their ankles. In some embodiments, the AI algorithm is configured to normalize the images so they can be compared to the initial baseline images and then evaluates changes in edema by estimating parameters from the images through image processing by the AI algorithm. In some embodiments, parameters can include, as non-limiting examples, one or more of ankle diameter, knee diameter, foot width, ratios of ankle diameter/knee diameter and ankle diameter/foot width, local variations in contour indicating pockets of swelling, and degree of pitting as recorded by pushing on edematous limb. In some embodiments, the AI algorithm is configured to compare dimensions in various regions of the leg and foot to normal database dimensions for subjects of same gender, age, and/or skeletal size, as non-limiting examples.

In some embodiments, the AI algorithm is configured to take as an input the images of the wound or ankles and automatically perform assessments relevant to the treatment and care. In some embodiments, to train such a model, photos of wounds in different stages of healing or ankles during different stages of edema are uploaded via a GUI and key regions of the photographs are labeled manually. In some embodiments, after training, the model can take any image and extract or estimate one or more parameters. In some embodiments, the AI algorithm is configured to analyze video may for pulsations of blood flow that may cause a different appearance of the wound. For example, the edges of the wound may move slightly with blood pulsations and the edematous ankle size may change slightly with each heartbeat. By training the model with videos during different phases of wound healing and/or edema recovery the ability of the AI algorithm to arrive at one or more determinations described herein is improved. In some embodiments, a video can record and quantify the pitting from (self-applied) pushing on the edematous limb. In some embodiments, red, green, blue, (RGB) color values for different regions of the image are be processed for wounds and wound margins, and the AI algorithm is configured to assess whether the color is healthy or unhealthy by automatic comparison to RGB values from photos of wounds of known health used to train the model. In some embodiments, wounds have distinct colors that indicate progression—red (healthy), pink (healthy), yellow (concern) and black (major concern). In some embodiments, the AI algorithm is configured to normalize an image color to the original baseline first image color at a distance away from the wound (for example, 10 inches away) to account for different lighting conditions each time a new image is taken and uploaded. In some embodiments, the color values mapped from infrared images can be interpreted by the AI algorithm and used together with the visible light images to provide better accuracy of the algorithm and insight on the temperature.

In some embodiments, for the edema applications, the AI algorithm is configured to determine a relationship between facial swelling and ankle swelling. Although facial swelling may be difficult to detect to the human eye, the AI algorithm is configured to find a correlation between edema changes in the ankles and face. In some embodiments, the AI algorithm model is trained on the relationship using photos of the face and ankles in subjects over time during recovery from edema. In some embodiments, this enables edema changes to be assessed with a webcam or photos of only the patient's face.

In some embodiments, by looking for changes on one side of the face or one ankle relative to the other, the AI algorithm is able to detect unilateral swelling of an extremity, which is a sign of deep venous thrombosis.

In some embodiments, the system includes one or more cameras configured to capture and store one or more images. For some embodiments described herein, a conventional webcam or smartphone camera is adequate. In some embodiments, the cameras are configured to capture static photos or video of adequate resolution to be able to determine wound area and ankle dimensions. In some embodiments, other cameras or cameras with special filters also form part of the system. In particular, a camera specifically for infrared or a camera with an infrared filter provides information on temperature fluctuations across the region of the wound. In some embodiments, a wound with higher temperature than the surrounding region is likely infected.

Figure 34:
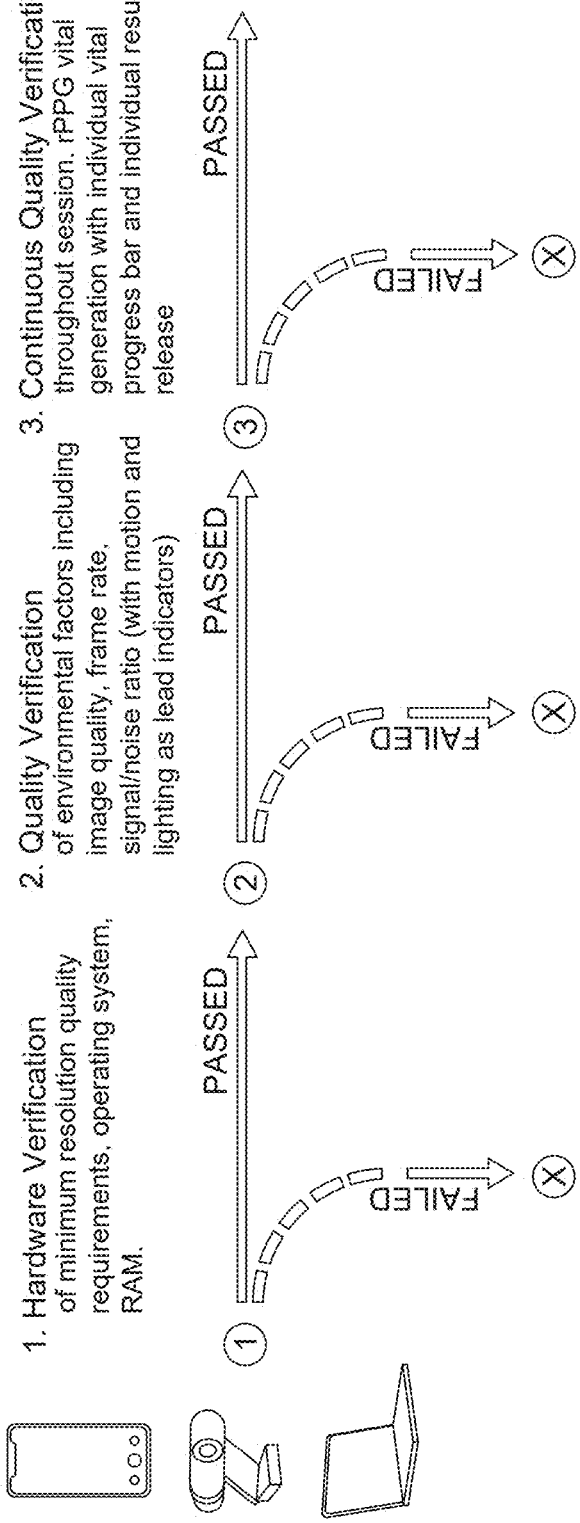
FIG. 34 shows an overview of a video vitals portion of the medial assessment system according to some embodiments.

FIG. 34 shows an overview of a video vitals portion of the medial assessment system according to some embodiments. In some embodiments, the system is configured initiate a remote assessment session using only a text message link. In some embodiments, the system does not require a user to download an App and/or use an App on a mobile device to join a remote assessment session. In some embodiments, a remote assessment session includes remote photoplethysmography (rPPG) data collection. In some embodiments, the system is directed to improvements in rPPG data collection. In some embodiments, the rPPG data collection is configured to enable the system to determine one or more user vitals. In some embodiments, one or more user vitals include one or more of heart rate, blood pressure, breathing rate, and oxygen saturation (SpO$_2$).

Figure 35:
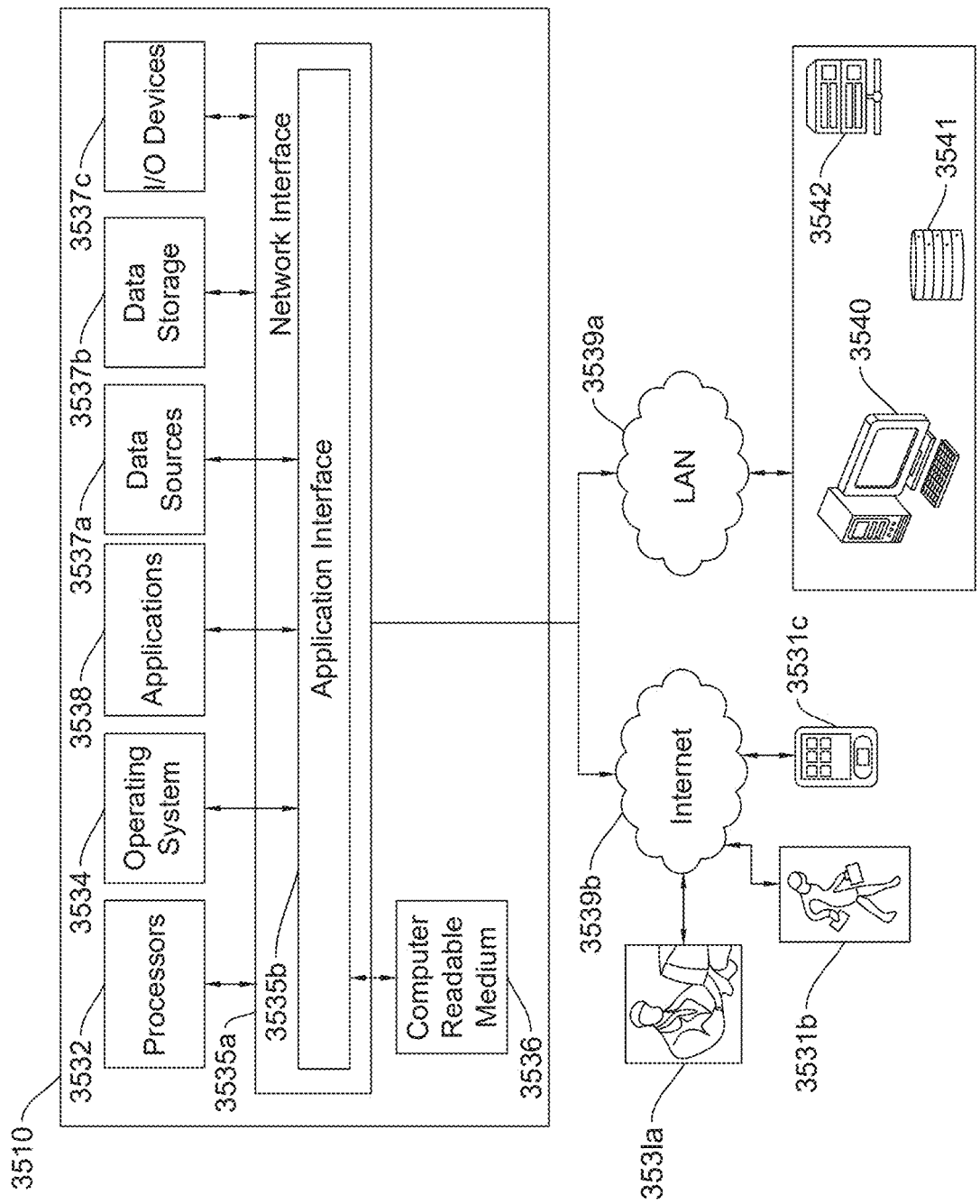
FIG. 35 illustrates the system recording rPPG signals separately in the red, green, and blue channels according to some embodiments.

FIG. 35 illustrates how the system is configured to record rPPG signals separately in the red, green, and blue channels according to some embodiments. In some embodiments, higher quality is achieved by recording vitals in separate color channels. In some embodiments, the system is configured to display the vitals on one or more GUIs.

Figure 36:
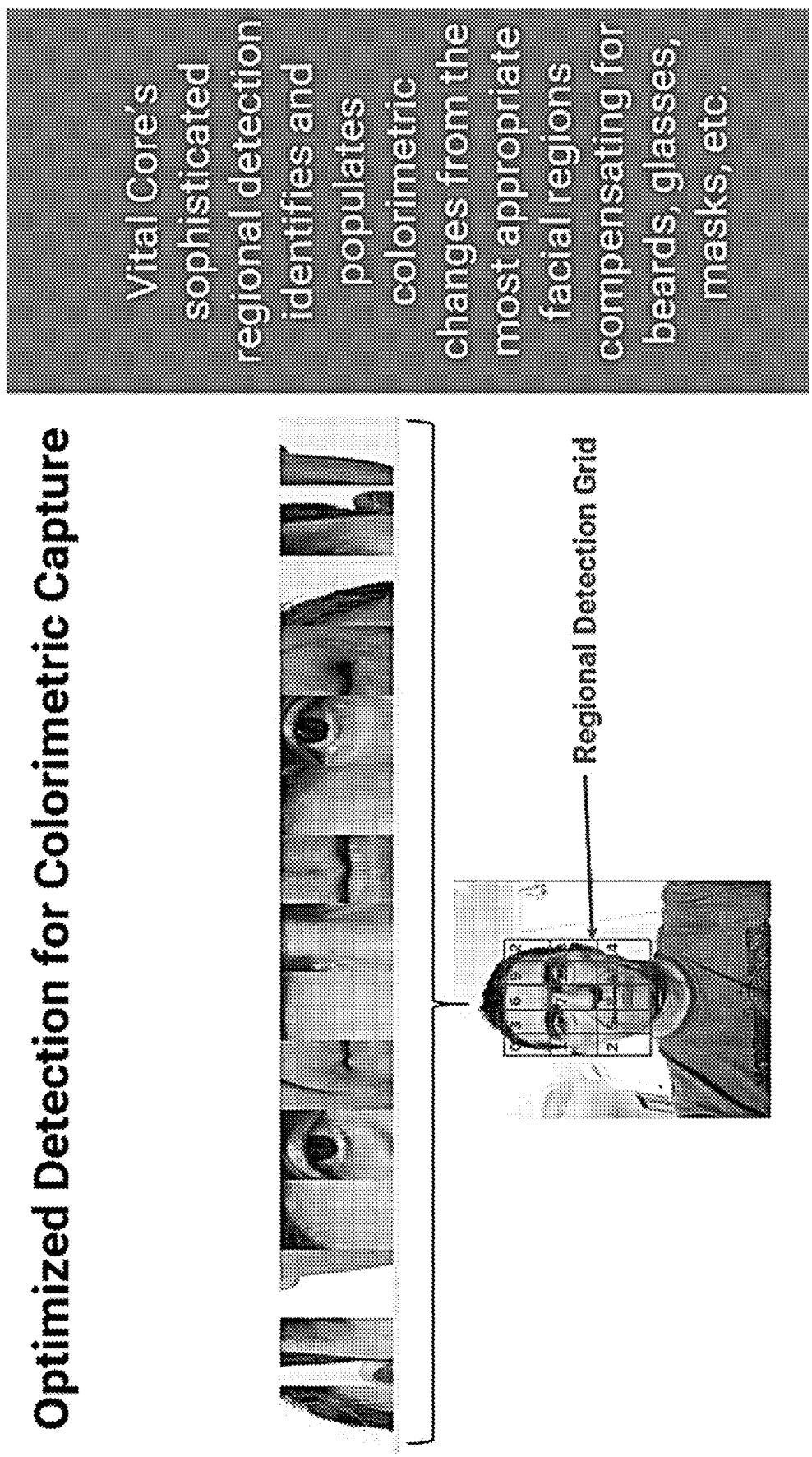
FIG. 36 shows a regional detection grid according to some embodiments.

FIG. 36 shows a regional detection grid according to some embodiments. In some embodiments, the system is configured to divide an area of assessment (e.g., face, area of a wound, edema, etc.) into a regional detection grid. In some embodiments, the regional detection grid comprises one or more subdivisions of an area of assessment. In some embodiments, the system is configured to obtain an rPPG signal from each of the one or more subdivisions. In some embodiments, the system is configured generate a normalized rPPG signal from each of the one or more subdivisions, thereby overcoming assessment challenges associated with patients that have beards or glasses.

Figure 37:
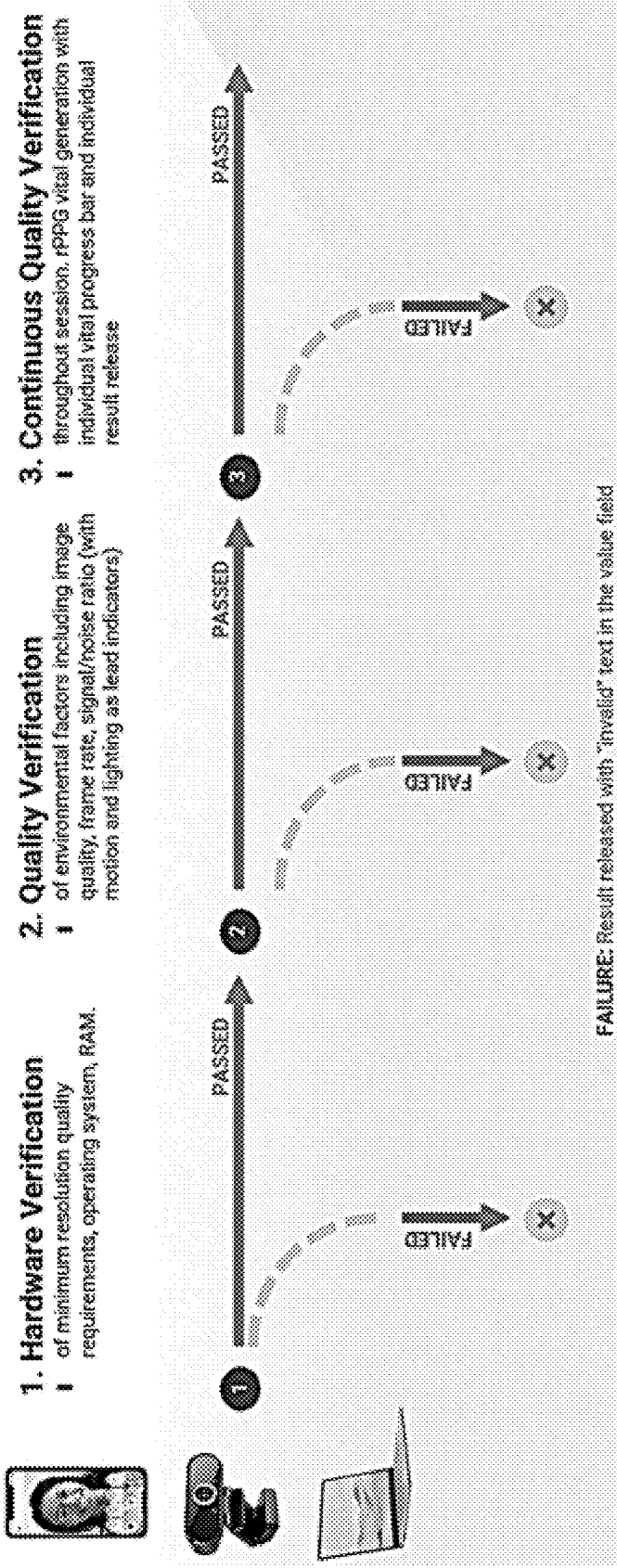
FIG. 37 depicts a vital core engagement cycle according to some embodiments.

FIG. 37 depicts a vital core engagement cycle according to some embodiments. In some embodiments, during a remote assessment session and/or a response to one or more requested images described above, the system is configured to provide a quality assessment of an image and/or environment. In some embodiments, the instructions cause the one or more computers to execute a hardware verification. In some embodiments, the hardware verification includes one or more of a minimum resolution quality requirement, operating system, and RAM. In some embodiments, the instructions cause the one or more computers to execute a quality verification. In some embodiments, quality verification includes one or more environmental factors such as image quality, frame rate, signal to noise ratio. In some embodiments, quality verification uses one or more of motion, scale, and lighting as lead indicators. In some embodiments, the instructions cause the one or more computers to execute a continuous quality verification. In some embodiments, a continuous quality verification is performed throughout a remote assessment. In some embodiments, a continuous quality verification includes a remote photoplethysmography (rPPG) vital generations with individual vital progress bar and individual result release.

Figure 38:
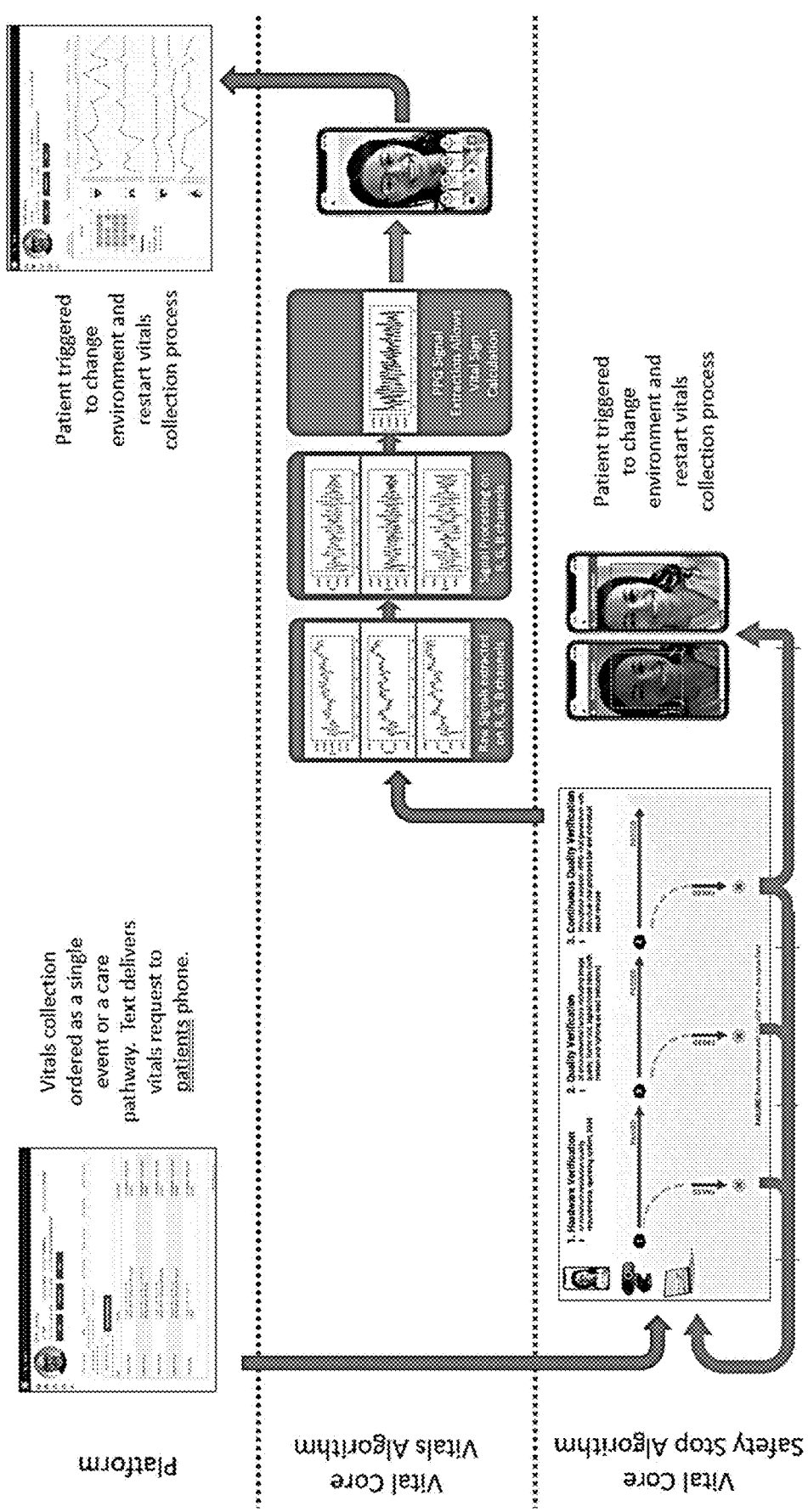
FIG. 38 shows a workflow for improving data collection according to some embodiments.

FIG. 38 shows a workflow for improving data collection according to some embodiments. In some embodiments, the system is configured to generate a vitals collection request. In some embodiments, if one or more failures occur during the quality assessment, the system is configured to generate one or more corrective actions. In some embodiments, a corrective action includes instructions to the patient to change location and/or environment and restart the vitals collection process. In some embodiments, the instructions include a request to use different hardware. In some embodiments, these instructions are repeated until quality is verified.

FIG. 39 shows the impact of the workflow of FIG. 38 according to some embodiments. As clearly shown, the steps executed by the system to improve quality of an rPPG assessment results in more consistent reading than a system not applying rejection criteria for hardware and environmental factors.

Figure 40:
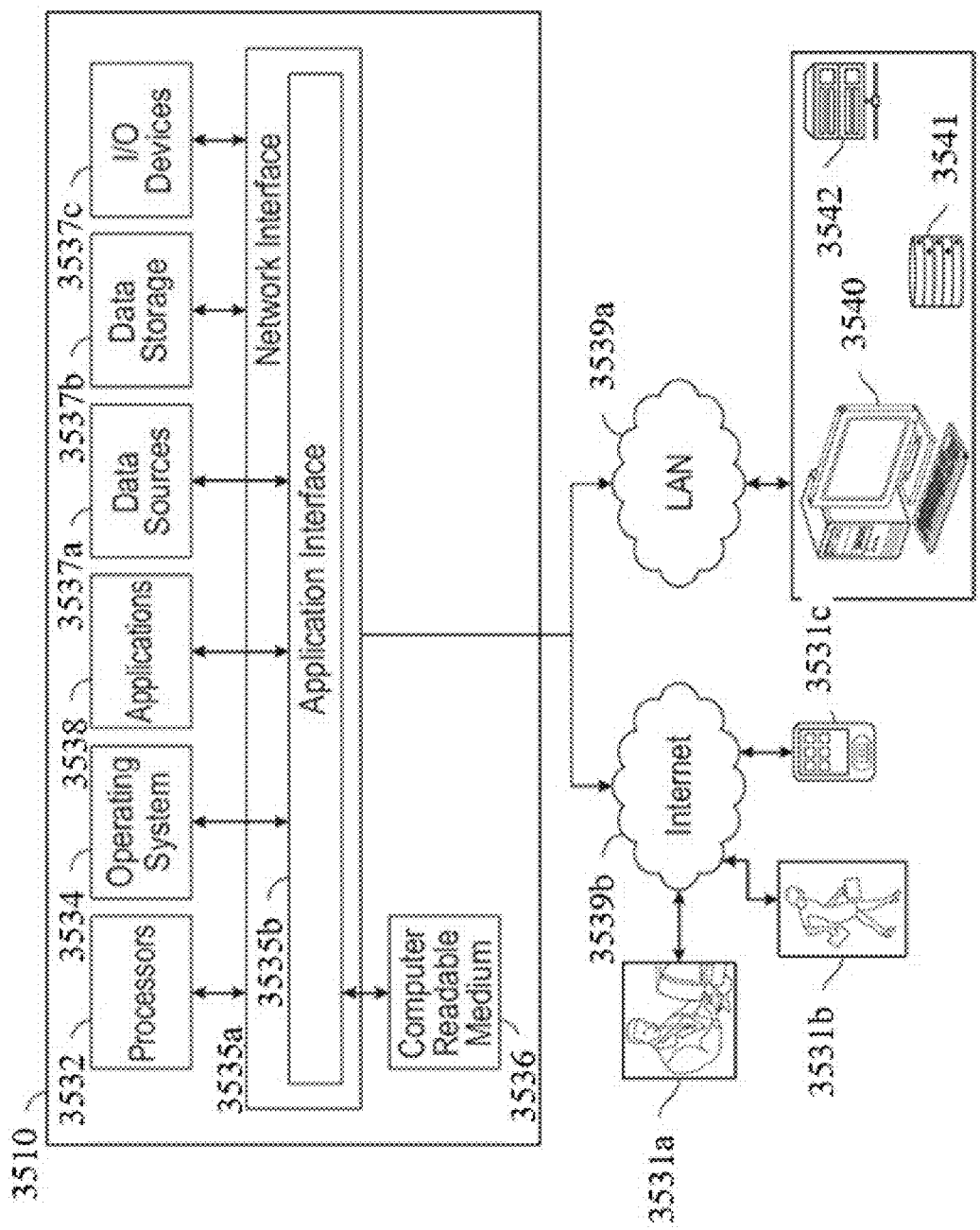
FIG. 40 illustrates a computer system 3510 enabling or comprising the systems and methods in accordance with some embodiments of the system.

FIG. 40 illustrates a computer system 3510 enabling or comprising the systems and methods in accordance with some embodiments of the system. In some embodiments, the computer system 3510 can operate and/or process computer-executable code of one or more software modules of the aforementioned system and method. Further, in some embodiments, the computer system 3510 can operate and/or display information within one or more graphical user interfaces (e.g., HMIs) integrated with or coupled to the system.

In some embodiments, the computer system 3510 can comprise at least one processor 3532. In some embodiments, the at least one processor 3532 can reside in, or coupled to, one or more conventional server platforms (not shown). In some embodiments, the computer system 3510 can include a network interface 3535a and an application interface 3535b coupled to the least one processor 3532 capable of processing at least one operating system 3534. Further, in some embodiments, the interfaces 3535a, 3535b coupled to at least one processor 3532 can be configured to process one or more of the software modules (e.g., such as enterprise applications 3538). In some embodiments, the software application modules 3538 can include server-based software, and can operate to host at least one user account and/or at least one client account, and operate to transfer data between one or more of these accounts using the at least one processor 3532.

With the above embodiments in mind, it is understood that the system can employ various computer-implemented operations involving data stored in computer systems. Moreover, the above-described databases and models described throughout this disclosure can store analytical models and other data on computer-readable storage media within the computer system 3510 and on computer-readable storage media coupled to the computer system 3510 according to various embodiments. In addition, in some embodiments, the above-described applications of the system can be stored on computer-readable storage media within the computer system 3510 and on computer-readable storage media coupled to the computer system 3510. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 3510 can comprise at least one computer readable medium 3536 coupled to at least one of at least one data source 3537a, at least one data storage 3537b, and/or at least one input/output 3537c. In some embodiments, the computer system 3510 can be embodied as computer readable code on a computer readable medium 3536. In some embodiments, the computer readable medium 3536 can be any data storage that can store data, which can thereafter be read by a computer (such as computer 3540). In some embodiments, the computer readable medium 3536 can be any physical or material medium that can be used to tangibly store the desired information or data or instructions and which can be accessed by a computer 3540 or processor 3532. In some embodiments, the computer readable medium 3536 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 3536 can transmit or carry instructions to a remote computer 3540 and/or at least one user 3531, including a router, private or public network, or other transmission or channel, both wired and wireless. In some embodiments, the software application modules 3538 can be configured to send and receive data from a database (e.g., from a computer readable medium 3536 including data sources 3537a and data storage 3537b that can comprise a database), and data can be received by the software application modules 3538 from at least one other source. In some embodiments, at least one of the software application modules 3538 can be configured within the computer system 3510 to output data to at least one user 3531 via at least one graphical user interface rendered on at least one digital display.

In some embodiments, the computer readable medium 3536 can be distributed over a conventional computer network via the network interface 3535*a* where the system embodied by the computer readable code can be stored and executed in a distributed fashion. For example, in some embodiments, one or more components of the computer system 3510 can be coupled to send and/or receive data through a local area network ("LAN") 3539*a* and/or an internet coupled network 3539*b* (e.g., such as a wireless internet). In some embodiments, the networks 3539*a*, 3539*b* can include wide area networks ("WAN"), direct connections (e.g., through a universal serial bus port), or other forms of computer-readable media 3536, or any combination thereof.

In some embodiments, components of the networks 3539*a*, 3539*b* can include any number of personal computers 3540 which include for example desktop computers, and/or laptop computers, or any fixed, generally non-mobile internet appliances coupled through the LAN 3539*a*. For example, some embodiments include one or more of personal computers 3540, databases 3541, and/or servers 3542 coupled through the LAN 3539*a* that can be configured for any type of user including an administrator. Some embodiments can include one or more personal computers 3540 coupled through network 3539*b*. In some embodiments, one or more components of the computer system 3510 can be coupled to send or receive data through an internet network (e.g., such as network 3539*b*). For example, some embodiments include at least one user 3531*a*, 3531*b*, is coupled wirelessly and accessing one or more software modules of the system including at least one enterprise application 3538 via an input and output ("I/O") 3537*c*. In some embodiments, the computer system 3510 can enable at least one user 3531*a*, 3531*b*, to be coupled to access enterprise applications 3538 via an I/O 3537*c* through LAN 3539*a*. In some embodiments, the user 3531 can comprise a user 3531*a* coupled to the computer system 3510 using a desktop computer, and/or laptop computers, or any fixed, generally non-mobile internet appliances coupled through the internet 3539*b*. In some embodiments, the user can comprise a mobile user 3531*b* coupled to the computer system 3510. In some embodiments, the user 3531*b* can connect using any mobile computing 3531*c* to wireless coupled to the computer system 3510, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of remote medical assessment by providing a system with GUIs that display patient conditions as well as artificial intelligence algorithms configured to identify abnormal conditions. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings are part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. Any figure depicting a content for display on a graphical user interface is a disclosure of the system configured to generate the graphical user interface and configured to display the contents of the graphical user interface. It is understood that defining the metes and bounds of the system using a description of images in the drawing does not need a corresponding text description in the written specification to fall with the scope of the disclosure.

In addition, the computer implemented steps described herein are representative of an algorithm stored on one or more non-transitory computer readable media. Those of ordinary skill would understand how to transform the recited steps and functionality into an executable code and therefore explicit recitations of example code are not needed to practice any protected subject matter.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. All flowcharts presented herein represent computer implemented steps and/or are visual representations of algorithms implemented by the system. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Furthermore, one or more system features and or steps can be described as a method step when defining the metes and bounds of the system although not explicitly recited as a method. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for analyzing one or more medical conditions as underlined:
   one or more computers comprising one or more processors and one or more non-transitory computer readable media, the one or more non-transitory computer readable media comprising instructions stored thereon that when executed cause the one or more computers to implement:

a graphical user interface (GUI), and an artificial intelligence (AI) algorithm;

wherein the GUI is configured to receive an upload of a first base image of skin to the one or more non-transitory computer readable media;

wherein the AI algorithm is configured to identify a unique permanent feature on the skin within the first base image;

wherein the AI algorithm is configured to use the unique permanent feature on the skin as a fiducial during an analysis of different images of the skin;

wherein the AI algorithm is configured to receive, by the one or more processors, the different images of the skin via the GUI;

wherein the AI algorithm is configured to execute, by the one or more processors, a comparison of the fiducial in the first base image to features within the different images;

wherein the AI algorithm is configured to determine, based on the comparison, if one or more of the features within one or more of the different images is a match to the fiducial within the first base image; and wherein the AI algorithm is configured to generate, by the one or more processors, one or more normalized images of one or more of the different images using the comparison; and wherein the analysis includes a determination of whether an abnormal condition associated with an area of the skin is progressing toward healing;

wherein the unique permanent feature includes a body feature;

wherein the body feature includes one or more of hair, freckles, scars, tattoos, moles, bumps, depressions, veins, joints, muscle shape, teeth, eyes, nose, ears, skin folds, and fingernails;

wherein the different images comprise a first image and a second image;

wherein the AI algorithm is trained to determine red, green, blue (RGB) color values for different regions of the first base image of skin;

wherein the training includes training the AI algorithm to determine RGB color value changes in the different images of the skin;

wherein the training includes sending to the AI algorithm a first training image set comprising the first base image of skin and the different images of the skin;

wherein the AI algorithm is configured to determine red, green, and blue (RGB) color values for different regions of the first image and the second image; and wherein the determination includes comparing the first image to the second image to determine a change in RGB values for the different regions from the first image to the second image.

2. The system of claim 1, further comprising medical assessment software;

wherein the medical assessment software is configured to enable communication between a health care provider and a patient; and wherein the medical assessment software comprises the GUI.

3. The system of claim 1, wherein the determination includes whether the abnormal condition associated with the area of the skin is at risk for infection, infected, and non-healing.

4. The system of claim 1, wherein the abnormal condition includes a wound; and wherein the determination includes one or more of wound length, wound width, wound area, wound margin width, within wound coloration, surrounding wound coloration, within wound dryness, within wound flakiness, surrounding wound dryness, and surrounding wound flakiness.

5. The system of claim 1, wherein the abnormal condition includes a wound; and wherein the AI algorithm is configured to determine a stage of wound healing.

6. The system of claim 1, wherein the one or more different images comprise a first infrared image and a second infrared image;

wherein the AI algorithm is configured to determine temperature values for different regions of the first infrared image and the second infrared image; and wherein the determination includes comparing the first infrared image to the second infrared image to determine a change in the temperature values for the different regions from the first infrared image to the second infrared image.

7. The system of claim 1, wherein the one or more non-transitory computer readable media comprise further instructions stored thereon that when executed cause the one or more computers to:

execute, by the AI algorithm, a transformation of the one or more different images to a matching scale of the first base image using a size of the one or more unique permanent features in the first base image to obtain the one or more normalized images.

8. The system of claim 1, wherein the one or more non-transitory computer readable media comprise further instructions stored thereon that when executed cause the one or more computers to:

determine, by the AI algorithm, if the abnormal condition comprises a surgical wound.

9. The system of claim 1, wherein the one or more non-transitory computer readable media comprise further instructions stored thereon that when executed cause the one or more computers to:

determine, by the AI algorithm, a change in shape of the abnormal condition.

10. The system of claim 1, wherein the AI algorithm is configured to transform the one or more different images to a matching orientation of the first base image using a location of the unique permanent feature features in the first base image.

11. The system of claim 1, wherein the AI algorithm is configured to execute a transformation of the one or more different images to a matching color of the first base image using a color of the one or more unique permanent feature features in the first base image to obtain the one or more normalized images.

* * * * *